US011990005B2

(12) United States Patent
Nguyen

(10) Patent No.: US 11,990,005 B2
(45) **Date of Patent: *May 21, 2024**

(54) GAMING SYSTEM SUPPORTING DATA DISTRIBUTION TO GAMING DEVICES

(71) Applicant: Aristocrat Technologies, Inc. (ATI), Las Vegas, NV (US)

(72) Inventor: Binh T. Nguyen, Reno, NV (US)

(73) Assignee: ARISTOCRAT TECHNOLOGIES, INC. (ATI), Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,761

(22) Filed: Sep. 14, 2020

(65) Prior Publication Data

US 2021/0005047 A1 Jan. 7, 2021

Related U.S. Application Data

(60) Continuation-in-part of application No. 16/559,553, filed on Sep. 3, 2019, now Pat. No. 11,682,266, and (Continued)

(51) Int. Cl.
*G07F 17/32* (2006.01)

(52) U.S. Cl.
CPC ........... *G07F 17/326* (2013.01); *G07F 17/32* (2013.01); *G07F 17/3225* (2013.01); (Continued)

(58) Field of Classification Search
CPC ............. G07F 17/3206; G07F 17/3218; G07F 17/323; G07F 17/3232; G07F 17/3225
See application file for complete search history.

(56) References Cited

U.S. PATENT DOCUMENTS

| | | | |
|---|---|---|---|
| 2,033,638 | A | 3/1936 | Koppl |
| 2,062,923 | A | 12/1936 | Nagy |

(Continued)

FOREIGN PATENT DOCUMENTS

| | | |
|---|---|---|
| GB | 2033638 | 5/1980 |
| GB | 2062923 | 5/1981 |

(Continued)

OTHER PUBLICATIONS

Benston, Liz, "Harrah Launches iPhone Appl Caesars Bypasses Check-in," Las Vegas Sun, Las Vegas, NV. Jan. 8, 2010.

(Continued)

*Primary Examiner* — William H McCulloch, Jr.
(74) *Attorney, Agent, or Firm* — McAndrews, Held & Malloy, Ltd.

(57) ABSTRACT

In one aspect, gaming machines and systems are configured to distribute of viral events, such as viral gaming events, amongst devices. The devices can, for example, be gaming machines and/or mobile devices. According to one embodiment, once a viral event is triggered, it is presented at one or more first devices at a first time. The viral event spreads to other devices, such as one or more second devices where it can be presented at a later time. The viral event may continue to spread to numerous other devices. In another aspect, an apparatus, method, and system to acquire and display casino data on a portable electronic device may include a portable electronic device operative with a real-time location based data application to transmit the location of the portable electronic device and acquire, prioritize, store and display real-time casino data.

17 Claims, 16 Drawing Sheets

Related U.S. Application Data a continuation-in-part of application No. 15/480,295, filed on Apr. 5, 2017, now Pat. No. 10,818,133, said application No. 16/559,553 is a continuation of application No. 14/518,909, filed on Oct. 20, 2014, now Pat. No. 10,438,446, said application No. 15/480,295 is a division of application No. 13/801,256, filed on Mar. 13, 2013, now Pat. No. 9,666,021, which is a continuation of application No. 12/797,610, filed on Jun. 10, 2010, now Pat. No. 9,626,826, said application No. 14/518,909 is a continuation of application No. 12/617,717, filed on Nov. 12, 2009, now Pat. No. 8,864,586.

(52) U.S. Cl.
CPC ...... *G07F 17/3244* (2013.01); *G07F 17/3272* (2013.01); *G07F 17/3218* (2013.01)

(56) References Cited

U.S. PATENT DOCUMENTS 4,741,539 A 5/1988 Sutton et al.
4,948,138 A 8/1990 Pease et al.
5,067,712 A 11/1991 Georgilas
5,275,400 A 1/1994 Weingardt
5,429,361 A 7/1995 Raven et al.
5,489,103 A 2/1996 Okamoto
5,630,757 A 5/1997 Gagin
5,655,961 A 8/1997 Acres et al.
5,704,835 A 1/1998 Dietz, II
5,727,786 A 3/1998 Weingardt
5,833,537 A 11/1998 Barrie
5,842,921 A 12/1998 Mindes
5,919,091 A 7/1999 Bell et al.
5,947,820 A 9/1999 Morro et al.
5,997,401 A 12/1999 Crawford
6,001,016 A 12/1999 Walker et al.
6,039,648 A 3/2000 Guinn et al.
6,059,289 A 5/2000 Vancura
6,089,977 A 7/2000 Bennett
6,095,920 A 8/2000 Sudahiro
6,110,041 A 8/2000 Walker et al.
6,142,872 A 11/2000 Walker et al.
6,146,271 A 11/2000 Kadici
6,146,273 A 11/2000 Olsen
6,165,071 A 12/2000 Weiss
6,231,445 B1 5/2001 Acres
6,244,958 B1 6/2001 Acres
6,270,412 B1 8/2001 Crawford et al.
6,290,600 B1 9/2001 Glasson
6,293,866 B1 9/2001 Walker et al.
6,353,390 B1 3/2002 Beri et al.
6,364,768 B1 4/2002 Acres et al.
6,404,884 B1 6/2002 Marwell et al.
6,416,406 B1 7/2002 Duhamel
6,416,409 B1 7/2002 Jordan
6,443,452 B1 9/2002 Brune
6,491,584 B2 12/2002 Graham et al.
6,505,095 B1 1/2003 Kolls
6,508,710 B1 1/2003 Paravia et al.
6,561,900 B1 5/2003 Baerlocker et al.
6,592,457 B1 7/2003 Frohm et al.
6,612,574 B1 9/2003 Cole et al.
6,620,046 B2 9/2003 Rowe
6,641,477 B1 11/2003 Dietz, II
6,645,078 B1 11/2003 Mattice
6,699,128 B1 3/2004 Beadell
6,719,630 B1 4/2004 Seelig et al.
6,749,510 B2 6/2004 Globbi
6,758,757 B2 7/2004 Luciano, Jr. et al.
6,773,345 B2 8/2004 Walker et al.
6,778,820 B2 8/2004 Tendler
6,780,111 B2 8/2004 Cannon et al.
6,799,032 B2 9/2004 McDonnell et al.
6,800,027 B2 10/2004 Giobbi et al.
6,804,763 B1 10/2004 Stockdale et al.
6,811,486 B1 11/2004 Luciano, Jr.
6,843,725 B2 1/2005 Nelson
6,846,238 B2 1/2005 Wells
6,848,995 B1 2/2005 Walker et al.
6,852,029 B2 2/2005 Baltz et al.
6,869,361 B2 3/2005 Sharpless et al.
6,875,106 B2 4/2005 Weiss et al.
6,884,170 B2 4/2005 Rowe
6,884,172 B1 4/2005 Lloyd et al.
6,902,484 B2 6/2005 Idaka
6,908,390 B2 6/2005 Nguyen et al.
6,913,532 B2 7/2005 Bearlocher et al.
6,923,721 B2 8/2005 Luciano et al.
6,935,958 B2 8/2005 Nelson
6,949,022 B1 9/2005 Showers et al.
6,955,600 B2 10/2005 Glavich et al.
6,971,956 B2 12/2005 Rowe et al.
6,984,174 B2 1/2006 Cannon et al.
6,997,803 B2 2/2006 LeMay et al.
7,018,292 B2 3/2006 Tracy et al.
7,032,115 B2 4/2006 Kashani
7,033,276 B2 4/2006 Walker et al.
7,035,626 B1 4/2006 Luciano
7,037,195 B2 5/2006 Schneider et al.
7,048,628 B2 5/2006 Schneider
7,048,630 B2 5/2006 Berg et al.
7,063,617 B2 6/2006 Brosnan et al.
7,076,329 B1 7/2006 Kolls
7,089,264 B1 8/2006 Guido et al.
7,094,148 B2 8/2006 Bearlocher et al.
7,105,736 B2 9/2006 Laakso
7,111,141 B2 9/2006 Nelson
7,144,321 B2 12/2006 Mayeroff
7,152,783 B2 12/2006 Charrin
7,169,041 B2 1/2007 Tessmer et al.
7,169,052 B2 1/2007 Beaulieu et al.
7,175,523 B2 2/2007 Gilmore et al.
7,181,228 B2 2/2007 Boesch
7,182,690 B2 2/2007 Giobbi et al.
7,198,571 B2 4/2007 LeMay
RE39,644 E 5/2007 Alcorn et al.
7,217,191 B2 5/2007 Allen et al.
7,243,104 B2 7/2007 Bill
7,247,098 B1 7/2007 Bradford et al.
7,259,718 B2 8/2007 Patterson et al.
7,275,989 B2 10/2007 Moody
7,285,047 B2 10/2007 Gielb et al.
7,311,608 B1 12/2007 Danieli
7,314,408 B2 1/2008 Cannon et al.
7,316,615 B2 1/2008 Soltys et al.
7,316,619 B2 1/2008 Nelson
7,318,775 B2 1/2008 Brosnan et al.
7,326,116 B2 2/2008 O'Donovan et al.
7,330,108 B2 2/2008 Thomas
7,346,358 B2 3/2008 Wood et al.
7,355,112 B2 4/2008 Laakso
7,384,338 B2 6/2008 Rothschild et al.
7,387,571 B2 6/2008 Walker et al.
7,393,278 B2 7/2008 Gerson et al.
7,396,990 B2 7/2008 Lu et al.
7,415,426 B2 8/2008 Williams et al.
7,425,177 B2 9/2008 Rodgers et al.
7,427,234 B2 9/2008 Soltys et al.
7,427,236 B2 9/2008 Kaminkow et al.
7,427,708 B2 9/2008 Ohmura
7,431,650 B2 10/2008 Kessman
7,448,949 B2 11/2008 Kaminkow et al.
7,500,913 B2 3/2009 Baerlocher
7,510,474 B2 3/2009 Carter
7,513,828 B2 4/2009 Nguyen et al.
7,519,838 B1 4/2009 Suurballe
7,559,838 B2 7/2009 Walker et al.
7,563,167 B2 7/2009 Walker et al.
7,572,183 B2 8/2009 Olivas et al.
7,585,222 B2 9/2009 Muir
7,602,298 B2 10/2009 Thomas

(56) References Cited

U.S. PATENT DOCUMENTS

| | | | |
|---|---|---|---|
| 7,607,174 | B1 | 10/2009 | Kashchenko et al. |
| 7,611,409 | B2 | 11/2009 | Muir et al. |
| 7,637,810 | B2 | 12/2009 | Amaitis et al. |
| 7,644,861 | B2 | 1/2010 | Alderucci et al. |
| 7,653,757 | B1 | 1/2010 | Fernald et al. |
| 7,693,306 | B2 | 4/2010 | Huber |
| 7,699,703 | B2 | 4/2010 | Muir |
| 7,722,453 | B2 | 5/2010 | Lark et al. |
| 7,742,996 | B1 | 6/2010 | Kwan |
| 7,758,423 | B2 | 7/2010 | Foster et al. |
| 7,771,271 | B2 | 8/2010 | Walker et al. |
| 7,780,529 | B2 | 8/2010 | Rowe et al. |
| 7,780,531 | B2 | 8/2010 | Englman et al. |
| 7,785,192 | B2 | 8/2010 | Canterbury et al. |
| 7,811,172 | B2 | 10/2010 | Asher et al. |
| 7,819,749 | B1 | 10/2010 | Fish |
| 7,822,688 | B2 | 10/2010 | Labron |
| 7,828,652 | B2 | 11/2010 | Nguyen et al. |
| 7,828,654 | B2 | 11/2010 | Carter |
| 7,828,661 | B1 | 11/2010 | Fish |
| 7,850,528 | B2 | 12/2010 | Wells |
| 7,874,919 | B2 | 1/2011 | Paulsen et al. |
| 7,877,798 | B2 | 1/2011 | Saunders et al. |
| 7,883,413 | B2 | 2/2011 | Paulsen |
| 7,892,097 | B2 | 2/2011 | Muir et al. |
| 7,909,692 | B2 | 3/2011 | Nguyen et al. |
| 7,909,699 | B2 | 3/2011 | Parrott et al. |
| 7,918,728 | B2 | 4/2011 | Nguyen et al. |
| 7,927,211 | B2 | 4/2011 | Rowe et al. |
| 7,927,212 | B2 | 4/2011 | Hedrick et al. |
| 7,951,008 | B2 | 5/2011 | Wolf et al. |
| 8,057,298 | B2 | 11/2011 | Nguyen et al. |
| 8,057,303 | B2 | 11/2011 | Rasmussen |
| 8,087,988 | B2 | 1/2012 | Nguyen et al. |
| 8,117,608 | B1 | 2/2012 | Slettehaugh et al. |
| 8,133,113 | B2 | 3/2012 | Nguyen |
| 8,182,326 | B2 | 5/2012 | Speers et al. |
| 8,210,927 | B2 | 7/2012 | Hedrick |
| 8,221,245 | B2 | 7/2012 | Walker |
| 8,226,459 | B2 | 7/2012 | Barrett |
| 8,226,474 | B2 | 7/2012 | Nguyen et al. |
| 8,231,456 | B2 | 7/2012 | Zielinski |
| 8,235,803 | B2 | 8/2012 | Loose et al. |
| 8,282,475 | B2 | 10/2012 | Nguyen et al. |
| 8,323,099 | B2 | 12/2012 | Durham et al. |
| 8,337,290 | B2 | 12/2012 | Nguyen et al. |
| 8,342,946 | B2 | 1/2013 | Amaitis |
| 8,393,948 | B2 | 3/2013 | Allen et al. |
| 8,403,758 | B2 | 3/2013 | Hornik et al. |
| 8,430,745 | B2 | 4/2013 | Agarwal et al. |
| 8,461,958 | B2 | 6/2013 | Saenz |
| 8,469,813 | B2 | 6/2013 | Joshi |
| 8,529,345 | B2 | 9/2013 | Nguyen |
| 8,597,108 | B2 | 12/2013 | Nguyen |
| 8,602,875 | B2 | 12/2013 | Nguyen |
| 8,613,655 | B2 | 12/2013 | Kisenwether et al. |
| 8,613,659 | B2 | 12/2013 | Nelson et al. |
| 8,622,823 | B2 | 1/2014 | Huynh |
| 8,678,901 | B1 | 3/2014 | Kelly |
| 8,696,470 | B2 | 4/2014 | Nguyen |
| 8,745,417 | B2 | 6/2014 | Huang et al. |
| 8,758,102 | B2 | 6/2014 | Block |
| 8,834,254 | B2 | 9/2014 | Buchholz et al. |
| 8,858,323 | B2 | 10/2014 | Nguyen et al. |
| 8,864,586 | B2 | 10/2014 | Nguyen |
| 8,942,995 | B1 | 1/2015 | Kerr |
| 9,039,507 | B2 | 5/2015 | Allen et al. |
| 9,235,952 | B2 | 1/2016 | Nguyen |
| 9,292,996 | B2 | 3/2016 | Davis et al. |
| 9,325,203 | B2 | 4/2016 | Nguyen |
| 9,466,171 | B2 | 10/2016 | Hornik |
| 9,483,901 | B2 | 11/2016 | Nguyen |
| 9,486,697 | B2 | 11/2016 | Nguyen |
| 9,486,704 | B2 | 11/2016 | Nguyen |
| 9,530,277 | B2 | 12/2016 | Nelson et al. |
| 9,576,425 | B2 | 2/2017 | Nguyen |
| 9,626,826 | B2 * | 4/2017 | Nguyen .............. G07F 17/3223 |
| 9,666,015 | B2 | 5/2017 | Acres |
| 9,666,021 | B2 * | 5/2017 | Nguyen .............. G07F 17/3218 |
| 9,672,686 | B2 | 6/2017 | Nguyen |
| 9,741,205 | B2 | 8/2017 | Nguyen |
| 9,811,973 | B2 | 11/2017 | Nguyen |
| 9,814,970 | B2 | 11/2017 | Nguyen |
| 9,842,462 | B2 | 12/2017 | Nguyen |
| 9,875,606 | B2 | 1/2018 | Nguyen |
| 9,875,609 | B2 | 1/2018 | Nguyen |
| 9,981,180 | B2 | 5/2018 | Koyanagi et al. |
| 10,068,429 | B2 | 9/2018 | Gagner et al. |
| 10,115,270 | B2 | 10/2018 | Gagner et al. |
| 10,140,816 | B2 | 11/2018 | Nguyen |
| 10,325,447 | B2 | 6/2019 | Malek |
| 10,421,010 | B2 | 9/2019 | Nguyen |
| 10,438,446 | B2 | 10/2019 | Nguyen |
| 10,445,978 | B2 | 10/2019 | Nguyen |
| 10,818,133 | B2 * | 10/2020 | Nguyen .............. G07F 17/3223 |
| 11,704,971 | B2 * | 7/2023 | Nguyen ................ G07F 17/326 463/42 |
| 2001/0004607 | A1 | 6/2001 | Olsen |
| 2001/0016516 | A1 | 8/2001 | Takatsuka |
| 2001/0024971 | A1 | 9/2001 | Brossard |
| 2001/0025272 | A1 | 9/2001 | Mori |
| 2001/0031659 | A1 | 10/2001 | Perrie |
| 2001/0047291 | A1 | 11/2001 | Garahi |
| 2002/0006822 | A1 | 1/2002 | Krintzman |
| 2002/0042295 | A1 | 4/2002 | Walker et al. |
| 2002/0043759 | A1 | 4/2002 | Vancura |
| 2002/0045474 | A1 | 4/2002 | Singer |
| 2002/0107065 | A1 | 8/2002 | Rowe |
| 2002/0111210 | A1 | 8/2002 | Luciano, Jr. et al. |
| 2002/0111213 | A1 | 8/2002 | McEntee et al. |
| 2002/0113369 | A1 | 8/2002 | Weingardt |
| 2002/0116615 | A1 | 8/2002 | Nguyen et al. |
| 2002/0133418 | A1 | 9/2002 | Hammond et al. |
| 2002/0137217 | A1 | 9/2002 | Rowe et al. |
| 2002/0142825 | A1 | 10/2002 | Lark et al. |
| 2002/0145051 | A1 | 10/2002 | Charrin |
| 2002/0147047 | A1 | 10/2002 | Letovsky et al. |
| 2002/0147049 | A1 | 10/2002 | Carter, Sr. |
| 2002/0151366 | A1 | 10/2002 | Walker et al. |
| 2002/0152120 | A1 | 10/2002 | Howington |
| 2002/0167536 | A1 | 11/2002 | Valdes et al. |
| 2002/0177483 | A1 | 11/2002 | Cannon |
| 2002/0183105 | A1 | 12/2002 | Cannon et al. |
| 2003/0001338 | A1 | 1/2003 | Bennett et al. |
| 2003/0003996 | A1 | 1/2003 | Nguyen |
| 2003/0004871 | A1 | 1/2003 | Rowe et al. |
| 2003/0008696 | A1 | 1/2003 | Abecassis et al. |
| 2003/0027635 | A1 | 2/2003 | Walker et al. |
| 2003/0064805 | A1 | 4/2003 | Wells |
| 2003/0064807 | A1 | 4/2003 | Walker et al. |
| 2003/0092480 | A1 | 5/2003 | White et al. |
| 2003/0100361 | A1 | 5/2003 | Sharpless et al. |
| 2003/0104860 | A1 | 6/2003 | Cannon et al. |
| 2003/0104865 | A1 | 6/2003 | Itkis et al. |
| 2003/0148809 | A1 | 8/2003 | Nelson |
| 2003/0148812 | A1 | 8/2003 | Paulsen |
| 2003/0162588 | A1 | 8/2003 | Brosnan et al. |
| 2003/0195024 | A1 | 10/2003 | Slattery |
| 2003/0199295 | A1 | 10/2003 | Vancura |
| 2003/0224852 | A1 | 12/2003 | Walker et al. |
| 2003/0224854 | A1 | 12/2003 | Joao |
| 2004/0002386 | A1 | 1/2004 | Wolfe et al. |
| 2004/0005919 | A1 | 1/2004 | Walker et al. |
| 2004/0023709 | A1 | 2/2004 | Beaulieu et al. |
| 2004/0023716 | A1 | 2/2004 | Gauselmann |
| 2004/0038736 | A1 | 2/2004 | Bryant |
| 2004/0048650 | A1 | 3/2004 | Mierau et al. |
| 2004/0068460 | A1 | 4/2004 | Feeley |
| 2004/0082384 | A1 | 4/2004 | Walker |
| 2004/0082385 | A1 | 4/2004 | Silva et al. |
| 2004/0094624 | A1 | 5/2004 | Fernandes |
| 2004/0106449 | A1 | 6/2004 | Walker et al. |
| 2004/0116115 | A1 | 6/2004 | Ertel |
| 2004/0127277 | A1 | 7/2004 | Walker |

(56) References Cited

U.S. PATENT DOCUMENTS

2004/0127290 A1 7/2004 Walker et al.
2004/0137987 A1 7/2004 Nguyen et al.
2004/0142744 A1 7/2004 Atkinson
2004/0147308 A1 7/2004 Walker et al.
2004/0152508 A1 8/2004 Lind
2004/0199631 A1 10/2004 Natsume
2004/0214622 A1 10/2004 Atkinson
2004/0224753 A1 11/2004 Odonovan et al.
2004/0229671 A1 11/2004 Stronach
2004/0256803 A1 12/2004 Ko
2004/0259633 A1 12/2004 Gentles et al.
2005/0003890 A1 1/2005 Hedrick et al.
2005/0004980 A1 1/2005 Vadjinia
2005/0026696 A1 2/2005 Hashimoto et al.
2005/0043996 A1 2/2005 Silver
2005/0054446 A1 3/2005 Kammler
2005/0101376 A1 5/2005 Walker et al.
2005/0101383 A1 5/2005 Wells
2005/0125244 A1 6/2005 Schneider
2005/0130728 A1 6/2005 Nguyen et al.
2005/0130731 A1 6/2005 Englman
2005/0136949 A1 6/2005 Barnes
2005/0137014 A1 6/2005 Vetelaninen
2005/0143169 A1 6/2005 Nguyen
2005/0170883 A1 8/2005 Muskin et al.
2005/0181865 A1 8/2005 Luciano
2005/0181870 A1 8/2005 Nguyen et al.
2005/0181875 A1 8/2005 Hoehne
2005/0187020 A1 8/2005 Amaitis et al.
2005/0202875 A1 9/2005 Murphy et al.
2005/0208993 A1 9/2005 Yoshizawa
2005/0209002 A1 9/2005 Blythe et al.
2005/0221881 A1 10/2005 Lannert
2005/0223219 A1 10/2005 Gatto et al.
2005/0239546 A1* 10/2005 Hedrick .............. G07F 17/3227
463/29
2005/0255919 A1 11/2005 Nelson
2005/0273635 A1 12/2005 Wilcox et al.
2005/0277471 A1 12/2005 Russell et al.
2005/0282637 A1 12/2005 Gatto et al.
2006/0009283 A1 1/2006 Englman et al.
2006/0036874 A1 2/2006 Cockerille
2006/0046822 A1 3/2006 Kaminkow et al.
2006/0046830 A1 3/2006 Webb
2006/0046849 A1 3/2006 Kovacs
2006/0068893 A1 3/2006 Jaffe et al.
2006/0073869 A1 4/2006 LeMay et al.
2006/0073897 A1 4/2006 Englman et al.
2006/0079317 A1 4/2006 Flemming et al.
2006/0121972 A1 6/2006 Walker
2006/0126529 A1 6/2006 Hardy
2006/0148551 A1 7/2006 Walker et al.
2006/0189382 A1 8/2006 Muir et al.
2006/0217170 A1 9/2006 Roireau
2006/0217193 A1 9/2006 Walker et al.
2006/0247028 A1 11/2006 Brosnan et al.
2006/0247035 A1 11/2006 Rowe et al.
2006/0252530 A1 11/2006 Oberberger et al.
2006/0253481 A1 11/2006 Guido et al.
2006/0256135 A1 11/2006 Aoyama
2006/0281525 A1 12/2006 Borissov
2006/0281541 A1 12/2006 Nguyen et al.
2006/0287106 A1 12/2006 Jensen
2007/0004510 A1 1/2007 Underdahl et al.
2007/0026935 A1 2/2007 Wolf et al.
2007/0026942 A1 2/2007 Kinsley
2007/0054739 A1 3/2007 Amaitis et al.
2007/0060254 A1 3/2007 Muir
2007/0060306 A1 3/2007 Amaitis et al.
2007/0060319 A1 3/2007 Block et al.
2007/0060358 A1 3/2007 Amaitas et al.
2007/0077981 A1 4/2007 Hungate et al.
2007/0087833 A1 4/2007 Feeney et al.
2007/0087834 A1 4/2007 Moser et al.
2007/0093299 A1 4/2007 Bergeron
2007/0129123 A1 6/2007 Eryou et al.
2007/0129148 A1 6/2007 Van Luchene
2007/0149279 A1 6/2007 Norden et al.
2007/0149286 A1 6/2007 Bemmel
2007/0155465 A1 7/2007 Walker
2007/0159301 A1 7/2007 Hirt et al.
2007/0161402 A1 7/2007 Ng et al.
2007/0184896 A1 8/2007 Dickerson
2007/0184904 A1 8/2007 Lee
2007/0191109 A1 8/2007 Crowder et al.
2007/0207852 A1 9/2007 Nelson et al.
2007/0207854 A1 9/2007 Wolf et al.
2007/0238505 A1 10/2007 Okada
2007/0241187 A1 10/2007 Alderucci et al.
2007/0243925 A1 10/2007 LeMay
2007/0248036 A1 10/2007 Nevalainen
2007/0257430 A1 11/2007 Hardy et al.
2007/0259713 A1 11/2007 Fiden et al.
2007/0259716 A1 11/2007 Mattice
2007/0259717 A1 11/2007 Mattice et al.
2007/0265984 A1 11/2007 Santhana
2007/0270213 A1 11/2007 Nguyen et al.
2007/0275777 A1 11/2007 Walker et al.
2007/0275779 A1 11/2007 Amaitis et al.
2007/0281782 A1 12/2007 Amaitis et al.
2007/0281785 A1 12/2007 Amaitas et al.
2007/0298873 A1 12/2007 Nguyen et al.
2008/0015032 A1 1/2008 Bradford et al.
2008/0020824 A1 1/2008 Cuddy et al.
2008/0020845 A1 1/2008 Low
2008/0032787 A1 2/2008 Low et al.
2008/0058105 A1 3/2008 Combs
2008/0070652 A1 3/2008 Nguyen et al.
2008/0070681 A1 3/2008 Marks et al.
2008/0076505 A1 3/2008 Nguyen
2008/0076506 A1 3/2008 Nguyen et al.
2008/0076548 A1 3/2008 Paulsen
2008/0076572 A1 3/2008 Nguyen et al.
2008/0096650 A1 4/2008 Baerlocher
2008/0102916 A1 5/2008 Kovacs
2008/0102956 A1 5/2008 Burman et al.
2008/0102957 A1 5/2008 Burnman et al.
2008/0108401 A1 5/2008 Baerlocher
2008/0113772 A1 5/2008 Burrill et al.
2008/0119267 A1 5/2008 Denlay
2008/0013906 A1 6/2008 Lutnick
2008/0146321 A1 6/2008 Parente
2008/0146344 A1 6/2008 Rowe et al.
2008/0150902 A1 6/2008 Edpalm et al.
2008/0153583 A1 6/2008 Huntley et al.
2008/0161110 A1 7/2008 Campbell
2008/0167106 A1 7/2008 Lutnick et al.
2008/0182667 A1 7/2008 Davis et al.
2008/0200251 A1 8/2008 Alderucci et al.
2008/0207307 A1 8/2008 Cunningham II et al.
2008/0214258 A1 9/2008 Brosnan et al.
2008/0215319 A1 9/2008 Lu
2008/0234047 A1 9/2008 Nguyen
2008/0238610 A1 10/2008 Rosenbereg
2008/0248849 A1 10/2008 Lutnick
2008/0248865 A1 10/2008 Cole
2008/0252419 A1 10/2008 Batchelor
2008/0254878 A1 10/2008 Sauders et al.
2008/0254881 A1 10/2008 Lutnick et al.
2008/0254883 A1 10/2008 Patel et al.
2008/0254891 A1 10/2008 Sauders et al.
2008/0254892 A1 10/2008 Sauders et al.
2008/0254897 A1 10/2008 Sauders et al.
2008/0263173 A1 10/2008 Weber et al.
2008/0300058 A1 12/2008 Sum et al.
2008/0305864 A1 12/2008 Kelly et al.
2008/0305865 A1 12/2008 Kelly et al.
2008/0305866 A1 12/2008 Kelly et al.
2008/0311994 A1 12/2008 Amaitas et al.
2008/0318669 A1 12/2008 Buchholz
2008/0318686 A1 12/2008 Crowder et al.
2009/0005165 A1 1/2009 Arezina et al.
2009/0011822 A1 1/2009 Englman
2009/0017906 A1 1/2009 Jackson

(56) References Cited

U.S. PATENT DOCUMENTS

2009/0021381 A1 1/2009 Higuchi
2009/0029766 A1 1/2009 Lutnick et al.
2009/0054149 A1 2/2009 Brosnan et al.
2009/0077396 A1 3/2009 Tsai et al.
2009/0088258 A1 4/2009 Saunders et al.
2009/0098925 A1 4/2009 Gagner et al.
2009/0104977 A1 4/2009 Zielinski
2009/0104983 A1 4/2009 Okada
2009/0118002 A1 5/2009 Lyons
2009/0118013 A1 5/2009 Finnimore et al.
2009/0118022 A1 5/2009 Lyons et al.
2009/0124366 A1 5/2009 Aoki et al.
2009/0124390 A1 5/2009 Seelig et al.
2009/0131146 A1 5/2009 Arezina et al.
2009/0131151 A1 5/2009 Harris et al.
2009/0132163 A1 5/2009 Ashley et al.
2009/0137255 A1 5/2009 Ashley et al.
2009/0138133 A1 5/2009 Buchholz et al.
2009/0143141 A1 6/2009 Wells
2009/0149245 A1 6/2009 Fabbri
2009/0149261 A1 6/2009 Chen et al.
2009/0153342 A1 6/2009 Thorn
2009/0156303 A1 6/2009 Kiely et al.
2009/0163272 A1 6/2009 Baker
2009/0176578 A1 7/2009 Herrmann et al.
2009/0191962 A1 7/2009 Hardy et al.
2009/0197684 A1* 8/2009 Arezina .............. G07F 17/3216 463/42
2009/0216547 A1 8/2009 Canora et al.
2009/0219901 A1 9/2009 Bull et al.
2009/0221342 A1 9/2009 Katz et al.
2009/0227302 A1 9/2009 Abe
2009/0239648 A1* 9/2009 Acres .................. G07F 17/3232 463/20
2009/0239666 A1 9/2009 Hall et al.
2009/0264190 A1 10/2009 Davis et al.
2009/0265105 A1 10/2009 Davis
2009/0270166 A1 10/2009 Thukral
2009/0270170 A1 10/2009 Patton
2009/0271287 A1 10/2009 Halpern
2009/0275410 A1 11/2009 Kisenwether et al.
2009/0275411 A1 11/2009 Kisenwether et al.
2009/0280910 A1 11/2009 Gagner et al.
2009/0282469 A1 11/2009 Lynch
2009/0298468 A1 12/2009 Hsu
2010/0002897 A1 1/2010 Keady
2010/0004058 A1 1/2010 Acres
2010/0016069 A1 1/2010 Herrmann
2010/0049738 A1 2/2010 Mathur et al.
2010/0056248 A1 3/2010 Acres
2010/0062833 A1 3/2010 Mattice et al.
2010/0062840 A1 3/2010 Herrmann et al.
2010/0079237 A1 4/2010 Falk
2010/0081501 A1 4/2010 Carpenter et al.
2010/0081509 A1 4/2010 Burke
2010/0099499 A1 4/2010 Amaitis et al.
2010/0105454 A1 4/2010 Weber et al.
2010/0106612 A1 4/2010 Gupta
2010/0113161 A1 5/2010 Walker
2010/0115591 A1 5/2010 Kane-Esrig
2010/0120486 A1 5/2010 DeWaal
2010/0124967 A1 5/2010 Lutnick et al.
2010/0130276 A1 5/2010 Fiden
2010/0160035 A1 6/2010 Herrmann
2010/0160043 A1 6/2010 Fujimoto et al.
2010/0178977 A1 7/2010 Kim et al.
2010/0184509 A1 7/2010 Sylla
2010/0197383 A1 8/2010 Rader et al.
2010/0197385 A1 8/2010 Aoki et al.
2010/0203955 A1 8/2010 Sylla
2010/0203963 A1 8/2010 Allen
2010/0227662 A1 9/2010 Speers et al.
2010/0227670 A1 9/2010 Arezine et al.
2010/0227671 A1 9/2010 Laaroussi
2010/0227687 A1 9/2010 Speers et al.
2010/0234091 A1 9/2010 Baerlocher et al.
2010/0279764 A1 11/2010 Allen et al.
2010/0323780 A1 12/2010 Acres
2010/0325703 A1 12/2010 Etchegoyen
2011/0009181 A1* 1/2011 Speer, II ............. G07F 17/3227 463/20
2011/0039615 A1 2/2011 Acres
2011/0053679 A1 3/2011 Canterbury et al.
2011/0065492 A1 3/2011 Acres
2011/0105216 A1 5/2011 Cohen
2011/0111827 A1 5/2011 Nicely et al.
2011/0111843 A1 5/2011 Nicely et al.
2011/0111860 A1 5/2011 Nguyen
2011/0118010 A1 5/2011 Brune
2011/0159966 A1 6/2011 Gura et al.
2011/0183732 A1 7/2011 Block
2011/0183749 A1 7/2011 Allen
2011/0207525 A1 8/2011 Allen
2011/0212711 A1 9/2011 Scott
2011/0212767 A1 9/2011 Barclay et al.
2011/0223993 A1 9/2011 Allen et al.
2011/0244952 A1 10/2011 Schueller
2011/0263318 A1 10/2011 Agarwal et al.
2011/0269548 A1 11/2011 Barclay et al.
2011/0306400 A1 12/2011 Nguyen
2011/0306426 A1 12/2011 Novak et al.
2012/0015709 A1 1/2012 Bennett et al.
2012/0028703 A1 2/2012 Anderson et al.
2012/0028718 A1 2/2012 Barclay et al.
2012/0034968 A1 2/2012 Watkins et al.
2012/0046110 A1 2/2012 Amaitis
2012/0094769 A1 4/2012 Nguyen et al.
2012/0100908 A1 4/2012 Wells
2012/0108319 A1 5/2012 Caputo et al.
2012/0122561 A1 5/2012 Hedrick
2012/0122567 A1 5/2012 Gangadharan et al.
2012/0122584 A1 5/2012 Nguyen
2012/0122590 A1 5/2012 Nguyen
2012/0172130 A1 7/2012 Acres
2012/0184362 A1 7/2012 Barclay et al.
2012/0184363 A1 7/2012 Barclay et al.
2012/0190426 A1 7/2012 Acres
2012/0194448 A1 8/2012 Rothkopf
2012/0208618 A1 8/2012 Frerking
2012/0231885 A1 9/2012 Speer, II
2012/0231888 A1 9/2012 Abe
2012/0239566 A1 9/2012 Everett
2012/0322563 A1 12/2012 Nguyen et al.
2012/0330740 A1 12/2012 Pennington et al.
2013/0005433 A1 1/2013 Holch
2013/0005443 A1 1/2013 Kosta
2013/0005453 A1 1/2013 Nguyen et al.
2013/0059650 A1 3/2013 Sylla et al.
2013/0065668 A1 3/2013 LeMay
2013/0281188 A1 3/2013 Guinn
2013/0103965 A1 4/2013 Golembeski
2013/0104193 A1 4/2013 Gatto et al.
2013/0130766 A1 5/2013 Harris et al.
2013/0132745 A1 5/2013 Schoening et al.
2013/0165210 A1 6/2013 Nelson
2013/0185559 A1 7/2013 Morel
2013/0196756 A1 8/2013 Nguyen
2013/0196776 A1 8/2013 Nguyen
2013/0210513 A1 8/2013 Nguyen
2013/0210514 A1 8/2013 Nguyen
2013/0210530 A1 8/2013 Nguyen
2013/0225279 A1 8/2013 Patceg
2013/0225282 A1 8/2013 Williams et al.
2013/0231192 A1 9/2013 Walker
2013/0252730 A1 9/2013 Joshi
2013/0316808 A1 11/2013 Nelson
2013/0337878 A1 12/2013 Shepherd
2013/0337889 A1 12/2013 Gagner
2014/0006129 A1 1/2014 Heath
2014/0057716 A1 2/2014 Massing et al.
2014/0087862 A1 3/2014 Burke
2014/0094295 A1 4/2014 Nguyen
2014/0094316 A1 4/2014 Nguyen
2014/0121005 A1 5/2014 Nelson

(56) References Cited

U.S. PATENT DOCUMENTS

| | | | |
|---|---|---|---|
| 2014/0179431 | A1 | 6/2014 | Nguyen |
| 2014/0235332 | A1 | 8/2014 | Block |
| 2014/0274306 | A1 | 9/2014 | Crawford |
| 2014/0274309 | A1 | 9/2014 | Nguyen |
| 2014/0274319 | A1 | 9/2014 | Nguyen |
| 2014/0274320 | A1 | 9/2014 | Nguyen |
| 2014/0274342 | A1 | 9/2014 | Nguyen |
| 2014/0274357 | A1 | 9/2014 | Nguyen |
| 2014/0274360 | A1 | 9/2014 | Nguyen |
| 2014/0274367 | A1 | 9/2014 | Nguyen |
| 2014/0274388 | A1 | 9/2014 | Nguyen |
| 2015/0089595 | A1 | 3/2015 | Telles |
| 2015/0133223 | A1 | 5/2015 | Carter |
| 2015/0143543 | A1 | 8/2015 | Phegade |
| 2016/0125695 | A1 | 5/2016 | Nguyen |
| 2017/0016819 | A1 | 4/2017 | Nguyen |
| 2017/0116823 | A1 | 4/2017 | Nguyen |
| 2017/0144071 | A1 | 5/2017 | Nguyen |
| 2017/0148259 | A1 | 5/2017 | Nguyen |
| 2017/0148261 | A1 | 5/2017 | Nguyen |
| 2017/0148263 | A1 | 5/2017 | Nguyen |
| 2017/0206734 | A1 | 7/2017 | Nguyen |
| 2017/0228979 | A1 | 8/2017 | Nguyen |
| 2017/0243440 | A1 | 8/2017 | Nguyen |
| 2017/0337770 | A1 | 11/2017 | Nguyen |
| 2018/0144581 | A1 | 5/2018 | Nguyen |
| 2019/0005773 | A1 | 1/2019 | Nguyen |
| 2019/0122490 | A1 | 4/2019 | Nguyen |
| 2019/0122492 | A1 | 4/2019 | Nguyen |
| 2019/0213829 | A1 | 7/2019 | Nguyen |

FOREIGN PATENT DOCUMENTS

| | | |
|---|---|---|
| GB | 2096376 | 10/1982 |
| GB | 2097570 | 11/1982 |
| GB | 2335524 | 9/1999 |
| PH | 12005000454 | 5/2007 |
| WO | WO 05073933 | 8/2005 |
| WO | WO 2008/027621 | 3/2008 |
| WO | WO 2009/026309 | 2/2009 |
| WO | WO 2009/062148 | 5/2009 |
| WO | 2010002897 | 1/2010 |
| WO | WO 2010/017252 A1 | 2/2010 |

OTHER PUBLICATIONS

Finnegan, Amanda, "Casinos Connecting with Customers via iPhone Apps", May 27, 2010, Las Vegas Sun, Las Vegas, NV.
Gaming Today Staff, "Slots showcased at 2009 National Indian Gaming Assoc.", GamingToday.com, Apr. 14, 2009.
Green, Marian, "Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Illinois at Urbana Champaign, Jun. 27, 2005.
Jones, Trahern, "Telecon-equipped drones could revolutionize wirelss market", azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
IAPS, Daily Systems LLC, 2010.
U.S. Appl. No. 12/945,888, filed Nov. 14, 2010.
U.S. Appl. No. 12/945,889, filed Nov. 14, 2010.
U.S. Appl. No. 13/622,702, filed Sep. 19, 2012.
U.S. Appl. No. 13/800,917, filed Mar. 13, 2013.
U.S. Appl. No. 13/296,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,192, filed Mar. 15, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/833,953, filed Mar. 15, 2013.
U.S. Appl. No. 12/619,672, filed Nov. 16, 2009.
U.S. Appl. No. 13/801,121, filed Mar. 13, 2013.
U.S. Appl. No. 12/581,115, filed Oct. 17, 2009.
U.S. Appl. No. 13/801,076, filed Mar. 13, 2013.
U.S. Appl. No. 13/617,717, filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256, filed Mar. 13, 2013.
U.S. Appl. No. 12/757,968, filed Apr. 9, 2010.
U.S. Appl. No. 12/797,616, filed Jun. 10, 2010.
U.S. Appl. No. 13/557,063, filed Jul. 24, 2012.
U.S. Appl. No. 13/833,116, filed Mar. 15, 2013.
U.S. Appl. No. 13/801,271, filed Mar. 13, 2011.
Office Action for U.S. Appl. No. 12/945,888 dated Apr. 10, 2012.
Final Office Action for U.S. Appl. No. 12/945,888 dated Sep. 21, 2012.
Advisory Action for U.S. Appl. No. 12/945,888 dated Jan. 30, 2013.
Office Action for U.S. Appl. No. 12/581,115 dated Dec. 20, 2011.
Final Office Action for U.S. Appl. No. 12/581,115 dated Sep. 13, 2012.
Notice of Allowance for U.S. Appl. No. 12/581,115 dated May 24, 2013.
Office Action for U.S. Appl. No. 12/619,672 dated Dec. 20, 2011.
Final Office Action for U.S. Appl. No. 12/619,672 dated Nov. 6, 2012.
Office Action for U.S. Appl. No. 12/619,672 dated March, 7, 2013.
Office Action for U.S. Appl. No. 12/617,717 dated Oct. 4, 2011.
Office Action for U.S. Appl. No. 12/617,717 dated Apr. 4, 2012.
Advisory Action for U.S. Appl. No. 12/617,717 dated Jun. 12, 2011.
Office Action for U.S. Appl. No. 12/617,717 dated Jun. 17, 2013.
Office Action for U.S. Appl. No. 12/797,610 dated Dec. 8, 2011.
Final Office Action for U.S. Appl. No. 12/797,610 dated Jun. 6, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Office Action for U.S. Appl. No. 12/797,616 dated Mar. 15, 2012.
Final Office Action for U.S. Appl. No. 12/797,616 dated Oct. 13, 2012.
Office Action for U.S. Appl. No. 12/797,616 dated Feb. 13, 2013.
Final Office Action for U.S. Appl. No. 12/797,616 dated May 8, 2013.
Office Action for U.S. Appl. No. 13/296,182 dated Dec. 5, 2012.
Brochure, 5000 Ft. Inc., 1 page, Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Notice of Allowance of U.S. Appl. No. 12/619,672, dated Aug. 23, 2013.
Office Action for U.S. Appl. No. 13/633,118, dated Sep. 20, 2013.
Office Action for U.S. Appl. No. 13/801,256, dated Jul. 2, 2013.
Notice of Allowance for U.S. Appl. No. 12/619,672, dated Oct. 3, 2013.
Notice of Allowance for U.S. Appl. No. 12/757,968, dated Oct. 11, 2013.
Final Office Action for U.S. Appl. No. 12/797,610, dated Jul. 10, 2013.
Notice of Allowance for U.S. Appl. No. 12/757,968, dated Dec. 18, 2013.
Office Action for U.S. Appl. No. 12/945,889, dated Dec. 18, 2013.
Office Action for U.S. Appl. No. 13/632,828, dated Jul. 30, 2013.
Restriction Requirement for U.S. Appl. No. 13/801,256, dated Dec. 30, 2013.
Office Action for U.S. Appl. No. 13/801,171, dated Dec. 26, 2013.
Office Action for U.S. Appl. No. 13/801,234, dated Jan. 10, 2014.
Final Office Action for U.S. Appl. No. 13/296,182, dated Feb. 12, 2014.

(56) References Cited

OTHER PUBLICATIONS

Office Action for U.S. Appl. No. 12/617,717, dated Feb. 25, 2014.
Office Action for U.S. Appl. No. 13/801,076, dated Mar. 28, 2014.
Final Office Action for U.S. Appl. No. 13/633,118, dated Apr. 3, 2014.
Office Action for U.S. Appl. No. 13/843,192, dated Apr. 3, 2014.
Office Action for U.S. Appl. No. 13/632,743, dated Apr. 10, 2014.
Office Action for U.S. Appl. No. 13/801,121, dated Apr. 11, 2014.
Final Office Action for U.S. Appl. No. 12/945,889, dated Jun. 30, 2014.
Notice of Allowance for U.S. Appl. No. 12/617,717, dated Jul. 14, 2014.
Office Action for U.S. Appl. No. 13/801,121, dated Sep. 24, 2014.
Office Action for U.S. Appl. No. 13/801,171, dated Sep. 22, 2014.
Office Action for U.S. Appl. No. 13/801,234, dated Oct. 1, 2014.
Office Action for U.S. Appl. No. 13/801,271, dated Oct. 31, 2014.
Final Office Action for U.S. Appl. No. 13/843,192, dated Oct. 21, 2014.
Office Action for U.S. Appl. No. 13/632,743, dated Oct. 23, 2014.
Office Action for U.S. Appl. No. 12/945,889, dated Oct. 23, 2014.
Office Action for U.S. Appl. No. 13/632,828, dated Nov. 7, 2014.
Office Action for U.S. Appl. No. 12/797,610, dated Dec. 15, 2014.
Final Office Action for U.S. Appl. No. 12/945,889, dated Feb. 12, 2015.
Final Office Action for U.S. Appl. No. 13/801,171, dated Mar. 16, 2015.
Office Action for U.S. Appl. No. 13/833,116, dated Mar. 27, 2015.
Office Action for U.S. Appl. No. 13/632,828, dated Apr. 10, 2015.
Final Office Action for U.S. Appl. No. 13/801,121, dated Apr. 21, 2015.
Final Office Action for U.S. Appl. No. 13/557,063, dated Apr. 28, 2015.
Office Action for U.S. Appl. No. 13/296,182, dated Jun. 5, 2015.
Office Action for U.S. Appl. No. 13/843,192, dated Jun. 19, 2015.
Office Action for U.S. Appl. No. 12/797,610, dated Jul. 14, 2015.
Final Office Action for U.S. Appl. No. 13/833,953, dated Jul. 17, 2015.
Notice of Allowance for U.S. Appl. No. 12/945,889, dated Jul. 22, 2015.
Office Action for U.S. Appl. No. 12/797,616, dated Aug. 10, 2015.
Final Office Action for U.S. Appl. No. 13/801,234, dated Aug. 14, 2015.
Final Office Action for U.S. Appl. No. 13/833,116, dated Sep. 24, 2015.
Office Action for U.S. Appl. No. 13/801,121, dated Oct. 2, 2015.
Office Action for U.S. Appl. No. 14/017,150, dated Oct. 7, 2015.
Office Action for U.S. Appl. No. 14/017,159, dated Oct. 7, 2015.
Office Action for U.S. Appl. No. 13/801,271 dated Oct. 19, 2015.
Office Action for U.S. Appl. No. 13/632,828 dated Oct. 19, 2015.
Final Office Action for U.S. Appl. No. 13/632,828, dated Oct. 22, 2015.
Office Action for U.S. Appl. No. 13/557,063, dated Dec. 17, 2015.
Notice of Allowance for U.S. Appl. No. 13/557,063, dated Dec. 23, 2015.
Office Action for U.S. Appl. No. 13/843,192, dated Dec. 23, 2015.
Final Office Action for U.S. Appl. No. 13/843,192, dated Dec. 30, 2015.
Office Action for U.S. Appl. No. 13/801,076, dated Jan. 11, 2016.
Office Action for U.S. Appl. No. 12/945,888, dated Jan. 22, 2016.
Final Office Action for U.S. Appl. No. 12/797,616, dated Jun. 12, 2016.
Office Action for U.S. Appl. No. 13/843,087, dated Feb. 25, 2016.
Office Action for U.S. Appl. No. 13/800,917, dated Feb. 25, 2016.
Office Action for U.S. Appl. No. 13/801,234, dated Mar. 8, 2016.
Office Action for U.S. Appl. No. 14/216,986, dated Mar. 9, 2016.
Final Office Action for U.S. Appl. No. 13/801,271, dated Mar. 11, 2016.
Office Action for U.S. Appl. No. 13/633,118, dated Mar. 22, 2016.
Final Office Action for U.S. Appl. No. 13/633,118, dated Mar. 24, 2016.
Final Office Action for U.S. Appl. No. 14/189,948, dated Apr. 6, 2016.
Final Office Action for U.S. Appl. No. 12/797,610, dated Apr. 21, 2016.
Final Office Action for U.S. Appl. No. 14/017,150, dated Apr. 26, 2016.
Final Office Action for U.S. Appl. No. 14/017,159, dated May 11, 2016.
Final Office Action for U.S. Appl. No. 14/017,159, dated Jun. 6, 2016.
Office Action for U.S. Appl. No. 13/801,171, dated Jun. 6, 2016.
Office Action for U.S. Appl. No. 13/833,953, dated Jun. 9, 2016.
Final OA for U.S. Appl. No. 13/833,953, dated Jun. 28, 2016.
Notice of Allowance for U.S. Appl. No. 13/833,953, dated Jul. 6, 2016.
Office Action for U.S. Appl. No. 13/801,076, dated Jul. 13, 2016.
Notice of Allowance for U.S. Appl. No. 13/801,076, dated Jul. 11, 2016.
Office Action for U.S. Appl. No. 13/296,182, dated Jul. 20, 2016.
Restriction Requirement for U.S. Appl. No. 13/296,182, dated Oct. 12, 2012.
Office Action for U.S. Appl. No. 13/296,182, dated Dec. 23, 2015.
Advisory Action for U.S. Appl. No. 13/843,192, dated May 8, 2014.
Office Action for U.S. Appl. No. 14/217,066, dated Dec. 22, 2016.
Final Office Action for U.S. Appl. No. 14/216,986, dated Sep. 23, 2016.
Office Action for U.S. Appl. No. 14/017,159, dated Sep. 23, 2016.
Office Action for U.S. Appl. No. 13/632,743, dated Sep. 23, 2016.
Final Office Action for U.S. Appl. No. 13/801,234, dated Oct. 14, 2016.
Final Office Action for U.S. Appl. No. 13/843,087, dated Oct. 13, 2016.
Final Office Action for U.S. Appl. No. 13/622,702, dated Oct. 13, 2016.
Office Action for U.S. Appl. No. 14/189,948, dated Nov. 7, 2016.
Final Office Action for U.S. Appl. No. 14/211,536, dated Mar. 14, 2014.
Notice of Allowance for U.S. Appl. No. 13/833,116, dated Oct. 11, 2016.
Notice of Allowance for U.S. Appl. No. 13/801,271, dated Dec. 2, 2016.
Notice of Allowance for U.S. Appl. No. 12/797,610, dated Dec. 7, 2016.
Notice of Allowance for U.S. Appl. No. 13/632,828, dated Dec. 16, 2016.
Final Office Action for U.S. Appl. No. 13/801,171, dated Dec. 19, 2016.
Notice of Allowance for U.S. Appl. No. 14/211,536, dated Dec. 28, 2016.
Notice of Allowance for U.S. Appl. No. 13/801,256, dated Jan. 20, 2017.
Office Action for U.S. Appl. No. 13/800,917, dated Feb. 3, 2017.
Final Office Action for U.S. Appl. No. 12/797,616, dated Feb. 10, 2017.
Office Action for U.S. Appl. No. 12/945,888, dated Feb. 28, 2017.
Final Office Action for U.S. Appl. No. 14/189,948, dated Mar. 17, 2017.
Office Action for U.S. Appl. No. 15/400,840, dated Mar. 10, 2017.
Notice of Allowance for U.S. Appl. No. 13/801,121, dated Mar. 29, 2017.
Office Action for U.S. Appl. No. 15/270,333, dated Mar. 30, 2017.
Office Action for U.S. Appl. No. 15/402,945, dated Apr. 5, 2017.
Office Action for U.S. Appl. No. 15/271,488, dated Apr. 19, 2017.
Final Office Action for U.S. Appl. No. 14/217,066, dated Apr. 21, 2017.
Office Action for U.S. Appl. No. 14/216,986 dated Apr. 26, 2017.
Office Action for U.S. Appl. No. 13/801,171, dated Jun. 14, 2017.
Office Action for U.S. Appl. No. 14/017,159, dated Jun. 29, 2017.
Notice of Allowance for U.S. Appl. No. 15/270,333, dated Jul. 5, 2017.
Final Office Action for U.S. Appl. No. 13/800,917, dated Jul. 13, 2017.

(56) References Cited

OTHER PUBLICATIONS

Notice of Allowance for U.S. Appl. No. 13/801,234, dated Jul. 5, 2017.
Notice of Allowance for U.S. Appl. No. 14/217,066, dated Jul. 14, 2017.
Final Office Action for U.S. Appl. No. 14/518,909, dated Jul. 19, 2017.
Final Office Action for U.S. Appl. No. 13/801,121, dated Sep. 15, 2016.
Advisory Action for U.S. Appl. No. 13/801,121, dated Jul. 17, 2015.
Advisory Action for U.S. Appl. No. 13/801,121, dated Jul. 19, 2016.
Notice of Allowance for U.S. Appl. No. 15/293,751, dated Aug. 4, 2017.
Advisory Action for U.S. Appl. No. 14/189,948, dated Jul. 28, 2017.
Final OA for U.S. Appl. No. 13/801,256, dated Aug. 15, 2014.
Final OA for U.S. Appl. No. 13/801,256, dated Feb. 18, 2015.
Advisory Action for U.S. Appl. No. 13/801,256, dated Dec. 5, 2014.
Office Action for U.S. Appl. No. 13/801,256, dated Jan. 12, 2016.
Final Office Action for U.S. Appl. No. 13/801,256, dated Aug. 16, 2016.
Office Action for U.S. Appl. No. 13/622,702, dated Aug. 31, 2017.
Office Action for U.S. Appl. No. 12/945,888, dated Sep. 1, 2017.
Office Action for U.S. Appl. No. 14/017,150, dated Sep. 7, 2017.
Notice of Allowance for U.S. Appl. No. 14/189,948, dated Sep. 13, 2017.
Office Action for U.S. Appl. No. 15/138,086, dated Oct. 19, 2017.
Notice of Allowance for U.S. Appl. No. 15/402,945 dated Nov. 21, 2017.
Final Office Action for U.S. Appl. No. 13/801,171, dated Dec. 13, 2017.
Final Office Action for U.S. Appl. No. 15/271,488, dated Dec. 21, 2017.
Office Action for U.S. Appl. No. 14/216,986, dated Dec. 22, 2017.
Final Office Action for U.S. Appl. No. 14/216,986, dated Dec. 26, 2017.
Restriction Requirement for U.S. Appl. No. 15/427,307, dated Jan. 17, 2018.
Office Action for U.S. Appl. No. 15/798,363, dated Jan. 26, 2018.
Office Action for U.S. Appl. No. 14/017,159, dated Jan. 29, 2018.
Final Office Action for U.S. Appl. No. 14/017,159, dated Feb. 1, 2018.
Final Office Action for U.S. Appl. No. 13/622,702, dated Feb. 22, 2018.
Office Action for U.S. Appl. No. 15/811,654, dated Feb. 22, 2018.
Final Office Action for U.S. Appl. No. 13/622,702, dated Feb. 27, 2018.
Final Office Action for U.S. Appl. No. 15/427,308, dated Mar. 19, 2018.
Office Action for U.S. Appl. No. 15/876,095, dated Apr. 3, 2018.
Office Action for U.S. Appl. No. 15/835,448, dated Apr. 4, 2018.
Office Action for U.S. Appl. No. 15/427,307, dated Apr. 9, 2018.
Office Action for U.S. Appl. No. 14/216,986, dated Apr. 6, 2018.
Office Action for U.S. Appl. No. 15/402,945 dated Apr. 16, 2018.
Notice of Allowance for U.S. Appl. No. 15/402,945, dated May 25, 2018.
Office Action for U.S. Appl. No. 15/427,291, dated Jun. 4, 2018.
Notice of Allowance for U.S. Appl. No. 15/427,291 dated Jun. 18, 2018.
Notice of Allowance for U.S. Appl. No. 15/271,488, dated Jun. 19, 2018.
Notice of Allowance for U.S. Appl. No. 15/480,295, dated Jun. 20, 2018.
Office Action for U.S. Appl. No. 14/963,106, dated Jun. 22, 2018.
Office Action for U.S. Appl. No. 14/993,055, dated Jun. 22, 2018.
Final Office Action for U.S. Appl. No. 15/427,307, dated Jul. 9, 2018.
Notice of Allowance for U.S. Appl. No. 13/633,118, dated Aug. 3, 2018.
Office Action for U.S. Appl. No. 15/671,133, dated Aug. 9, 2018.
Office Action for U.S. Appl. No. 15/427,308, dated Aug. 15, 2018.
Office Action for U.S. Appl. No. 15/798,363, dated Aug. 29, 2018.
Office Action for U.S. Appl. No. 15/428,922 dated Sep. 17, 2018.
Office Action for U.S. Appl. No. 15/495,975, dated Sep. 21, 2018.
Notice of Allowance for U.S. Appl. No. 15/271,488, dated Sep. 24, 2018.
Notice of Allowance for U.S. Appl. No. 15/876,095, dated Sep. 24, 2018.
Office Action for U.S. Appl. No. 13/622,702, dated Oct. 3, 2018.
Office Action for U.S. Appl. No. 15/293,751, dated Apr. 6, 2017.
Notice of Allowance for U.S. Appl. No. 13/801,171, dated Oct. 31, 2018.
Final Office Action for U.S. Appl. No. 15/835,448, dated Nov. 2, 2018.
Final Office Action for U.S. Appl. No. 15/480,295, dated Nov. 7, 2018.
Final Office Action for U.S. Appl. No. 14/963,106, dated Dec. 14, 2018.
Final Office Action for U.S. Appl. No. 14/993,055, dated Dec. 14, 2018.
Office Action for U.S. Appl. No. 16/162,358, dated Dec. 31, 2018.
Office Action for No. U.S. Appl. No. 15/428,922 dated Sep. 17, 2018.
Office Action for U.S. Appl. No. 14/017,159, dated Jan. 11, 2019.
Office Action for U.S. Appl. No. 15/426,898, dated Jan. 11, 2019.
Final Office Action for U.S. Appl. No. 15/495,973, dated Jan. 11, 2019.
Office Action for U.S. Appl. No. 14/216,986, dated Jan. 14, 2019.
Office Action for U.S. Appl. No. 15/427,307, dated Jan. 18, 2019.
Final Office Action for U.S. Appl. No. 15/798,363, dated Feb. 4, 2019.
Office Action for U.S. Appl. No. 16/125,614, dated Feb. 25, 2019.
Final Office Action for U.S. Appl. No. 15/495,975, dated Apr. 18, 2019.
Office Action for U.S. Appl. No. 15/671,133, dated May 1, 2019.
Notice of Allowance for U.S. Appl. No. 14/216,986, dated May 17, 2019.
Notice of Allowance for U.S. Appl. No. 14/518,909, dated May 17, 2019.
Office Action for U.S. Appl. No. 12/797,616, dated Jun. 5, 2019.
Office Action for U.S. Appl. No. 15/427,308, dated Jun. 14, 2019.
Office Action for U.S. Appl. No. 15/811,654, dated Jun. 14, 2019.
Office Action for U.S. Appl. No. 15/674,480, dated Jun. 20, 2019.
Notice of Allowance for U.S. Appl. No. 15/835,448, dated Jul. 3, 2019.
Final Office Action for U.S. Appl. No. 16/162,358, dated Jul. 11, 2019.
Office Action for U.S. Appl. No. 16/190,050, dated Sep. 19, 2019.
Office Action for U.S. Appl. No. 14/017,150, dated Oct. 9, 2019.
Final Office Action for U.S. Appl. No. 15/671,133, dated Oct. 18, 2019.
Office Action for U.S. Appl. No. 15/835,448 dated Oct. 12, 2019.
Notice of Allowance for U.S. Appl. No. 15/495,975, dated Oct. 23, 2019.
Notice of Allowance for U.S. Appl. No. 14/993,005, dated Nov. 27, 2019.
Final Office Action for U.S. Appl. No. 15/427,308, dated Nov. 27, 2019.
Office Action for U.S. Appl. No. 15/798,363, dated Jan. 8, 2020.
Office Action for U.S. Appl. No. 15/835,448, dated Mar. 5, 2020.
Office Action for U.S. Appl. No. 15/495,975, dated Mar. 17, 2020.
Office Action for U.S. Appl. No. 16/248,759, dated Apr. 1, 2020.
Final Office Action for U.S. Appl. No. 14/017,150, dated Apr. 17, 2020.
Notice of Allowance for U.S. Appl. No. 15/798,363, dated May 12, 2020.
Office Action for U.S. Appl. No. 16/357,316, dated May 21, 2020.
Office Action for U.S. Appl. No. 15/674,480, dated Jun. 5, 2020.
Notice of Allowance for U.S. Appl. No. 15/480,295, dated Jun. 15, 2020.
Office Action for U.S. Appl. No. 13/622,702, dated Jun. 22, 2020.
Office Action for U.S. Appl. No. 15/811,654, dated Jun. 26, 2020.
Office Action for U.S. Appl. No. 16/579,754, dated Jul. 22, 2020.
Office Action for U.S. Appl. No. 16/219,940, dated Jul. 22, 2020.

(56) References Cited

OTHER PUBLICATIONS

Office Action for U.S. Appl. No. 16/559,553, dated Sep. 11, 2020.
Office Action for U.S. Appl. No. 16/794,212, dated Sep. 11, 2020.
Restriction Requirement for U.S. Appl. No. 16/600,395, dated Sep. 18, 2020.
Final Office Action for U.S. Appl. No. 16/248,759, dated Oct. 6, 2020.
Final Office Action for U.S. Appl. No. 15/671,133, dated Oct. 7, 2020.
Final Office Action for U.S. Appl. No. 16/357,316, dated Oct. 8, 2020.
Final Office Action for U.S. Appl. No. 16/183,632, dated Oct. 9, 2020.
Office Action for U.S. Appl. No. 16/590,347, dated Oct. 13, 2020.
Advisory Action for U.S. Appl. No. 13/632,828, dated Feb. 25, 2016.
Final Office Action for U.S. Appl. No. 13/801,171, dated May 21, 2014.
Final Office Action for U.S. Appl. No. 13/801,234, dated May 22, 2014.
Advisory Action for U.S. Appl. No. 13/296,182, dated May 8, 2014.
Notice of Allowance for U.S. Appl. No. 13/843,192, dated Aug. 10, 2016.
Office Action (Final Rejection) dated May 5, 2022 for U.S. Appl. No. 17/080,808 (pp. 1-10).
Office Action (Non-Final Rejection) dated Sep. 9, 2022 for U.S. Appl. No. 17/080,808 (pp. 1-11).
Office Action (Notice of Allowance and Fees Due (PTOL-85) dated Mar. 9, 2023 for U.S. Appl. No. 17/080,808 (pp. 1-5).
Office Action (Notice of Allowance and Fees Due (PTOL-85)) dated Mar. 23, 2023 for U.S. Appl. No. 17/080,808 (pp. 1-2).

* cited by examiner

GAMING SYSTEM SUPPORTING DATA DISTRIBUTION TO GAMING DEVICES

CROSS-REFERENCE TO RELATED APPLICATIONS

This application is a continuation-in-part of U.S. application Ser. No. 16/559,553, filed Sep. 3, 2019, and entitled "GAMING SYSTEMS INCLUDING VIRUAL BENEFIT DISTRIBUTION," which is hereby incorporated herein by reference, and which in turn is a continuation of U.S. application Ser. No. 14/518,909, filed Oct. 20, 2014, and entitled "VIRUAL BENEFIT DISTRIBUTION USING ELECTRONIC DEVICES," which is hereby incorporated herein by reference, and which in turn is a continuation of U.S. application Ser. No. 12/617,717, filed Nov. 12, 2009, and entitled "GAMING SYSTEMS INCLUDING VIRAL GAMING EVENTS," now U.S. Pat. No. 8,864,586), which is hereby incorporated herein by reference.

This application is continuation-in-part of U.S. patent application Ser. No. 15/480,295, filed Apr. 5, 2017, and entitled "LOCATION BASED REAL-TIME CASINO DATA", which is hereby incorporated herein by reference for all purposes, which in turn is a divisional of U.S. patent application Ser. No. 13/801,256, filed Mar. 13, 2013, and entitled "LOCATION BASED REAL-TIME CASINO DATA", which is hereby incorporated herein by reference for all purposes, which in turn is a continuation of U.S. patent application Ser. No. 12/797,610, filed Jun. 10, 2010, and entitled "LOCATION BASED REAL-TIME CASINO DATA", now U.S. Pat. No. 9,626,826, which is hereby incorporated herein by reference for all purposes.

BACKGROUND OF THE INVENTION

Early gaming machines presented a single wagering game. For example, early slot machines presented a single game in which a set of reels were spun and the stopping positions of the reels define the outcome of the game. Later, video gaming machines were developed. These gaming machines were configured to present slot games in a video format, as well as other games such as video poker.

In order to increase the excitement associated with these games, various secondary game events have been developed. For example, gaming machines have been outfitted with rotating wheels. When a player receives a particular winning result of a base game, such as a particular slot reel outcome, the wheel may spin and stop on a segment which defines a bonus award. Similarly, video gaming machines have been configured to present various video secondary events. These events may comprise a variety of animated sequences which provide entertainment and the potential for awards.

Also, as gaming machines have been linked to gaming systems, awards have been developed which increase the number of participating players. For example, gaming machines may be linked to a jackpot system. If a player of one of the gaming machines of the system obtains a particular winning outcome, they may be awarded the jackpot. In order to increase the level of excitement of such a system, the players of other gaming machines at which the jackpot was not won may be awarded a consolation prize.

Still, these secondary events or awards have limitations, and new and exciting gaming events remain desirable.

Electronic gaming devices such as slot machines, videos poker machines, and keno machines account for almost 70% of the revenue generated by a casino. There are numerous gaming themes that are in casinos and in development. As these trends continue, players will be bombarded by a bewildering array of gaming choices. As casinos become larger and more crowed, locating desired games becomes more difficult and frustrating for individual players.

A primary objective of a casino is to entice players to play for longer time periods. A personalized gaming experience may compel players to extend gaming sessions. Making it easier for players to locate and access casino services will provide a more compelling and enjoyable casino experience. With the recent growth of technologies associated with wireless networks, software as a service, and personal electronic devices such as smart phones, mobile media devices, tablet computing devices, and the like, increasingly the portable electronic devices have become the main device for users to access information and services. Many of the information and services are based on the location of the users.

While software applications for handheld devices are beginning to surface for casino environments, these applications are mostly geared towards simple data access. Intelligent location-based and player-based data are non-existent as indoor-locationing technology is still in its infancy. Additionally, the locational precision that's required of an indoor-locationing system to pinpoint a device or a person, and the sheer number of wireless devices carried by people who are next each other in a confined space, cause the accuracy to plunge, while cost of the system to ascend. A simple and robust system, method, and apparatus to reliably deliver player-relevant data to mobile devices in the crowded, secured, highly regulated, casino environment is desired.

OVERVIEW

According to one aspect, some embodiments can be associated with distribution of viral events, such as viral gaming events, amongst devices. The devices can present the viral events. The devices can, for example, be gaming machines and/or mobile devices. In accordance with one aspect, a viral gaming event is triggered and is first presented at one or more first gaming machines at a time T1. The viral gaming event then spreads to one or more second gaming machines at a time T2 which is later than the time T1. The viral gaming event may comprise a gaming event such as a bonus event, or a non-gaming event such as a promotional message from the casino or an alert. The viral gaming event may be the same or different at each gaming machine. The viral gaming event may comprise a single player event (i.e. played by the player of the particular machine) or be a group event (wherein multiple players participate in the event).

According to another aspect, some embodiments concern a system, method, and apparatus capable of acquiring, transmitting, and presenting location based real-time casino data. In one embodiment, a portable electronic device, comprising a processor configured to receive real-time casino data associated with the location of the portable electronic device, an indoor location identifying device configured to indicate a location of the portable electronic device, a software application operative with the processor and configured to transmit a location of the portable electronic device and receive real-time casino data, an authentication device configured to verify and grant data access privileges to the at least one portable electronic device's software application, and a display configured to present the real-time casino data.

The present invention provides other hardware configured to perform the methods of the invention, as well as software stored in a machine-readable medium (e.g., a tangible storage medium) to control devices to perform these methods. These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings.

DESCRIPTION OF EXAMPLE EMBODIMENTS

In general, one aspect disclosed herein concerns viral game events, methods of game play ("games") including such events, and gaming machines and systems configured to present such events or features. A viral gaming event comprises a gaming event, such as a bonus or secondary event, which spreads from one or more first gaming machines to one or more additional gaming machines.

Content associated with a viral game event could be a game feature such as a bonus, a game symbol, a message from the server, a promotional message from the casino, an informational alert, and the like. The viral game event could be implemented as a software module. The software module monitors game events, gathers data, views files, processes logic, displays animation, etc., at the gaming devices. In one implementation, the viral game software is a self-contained distributed software application that's constructed with popular programming and languages such as C, C++, Java, C#, Perl, Javascript, Python, etc. The software module is transferred to a gaming device for execution. In another implementation, the viral game event is built as a web service to be executed at a remote server.

Figure 1:
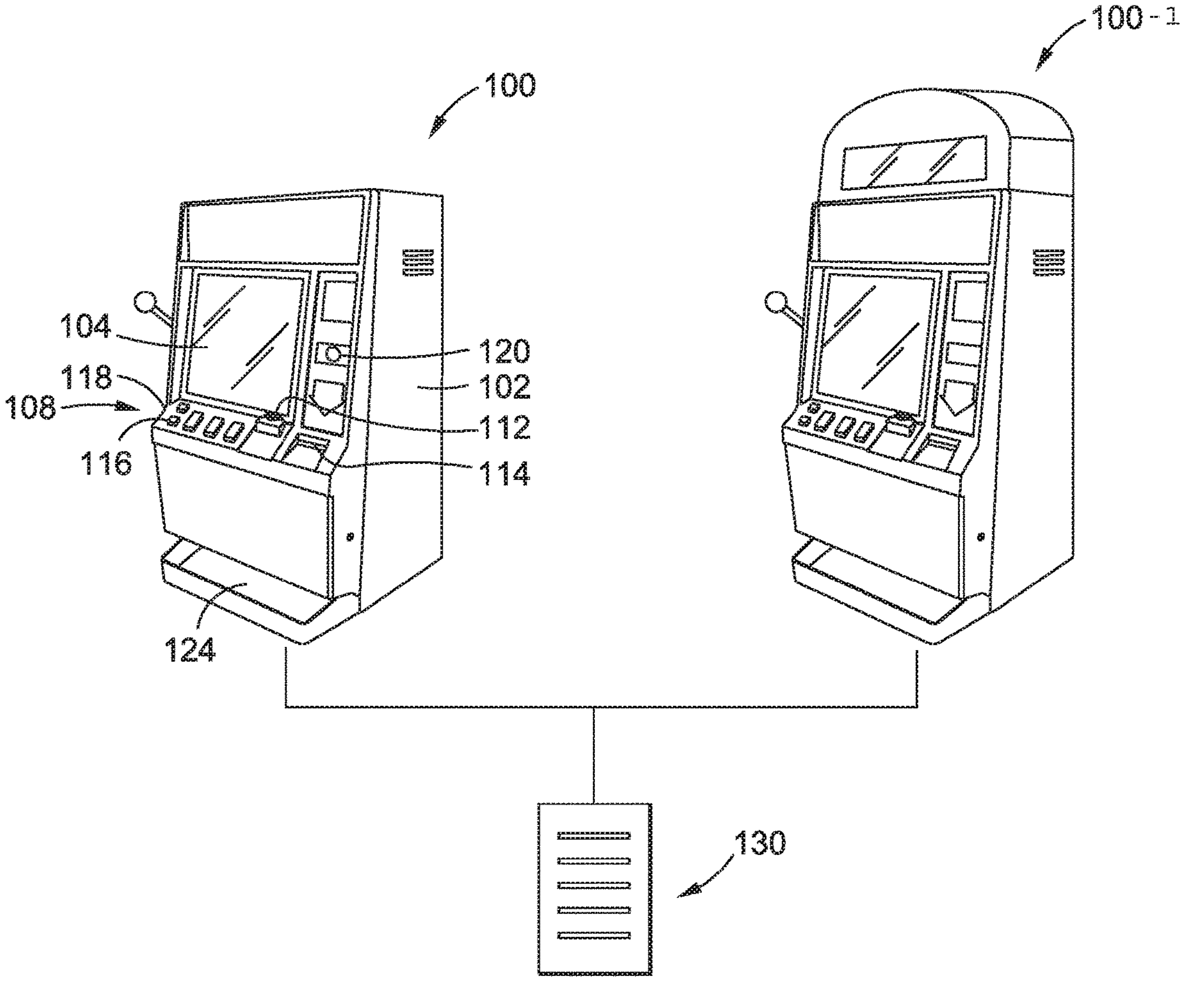
FIG. 1 illustrates gaming machines and a gaming system which may present a viral gaming event in accordance with one embodiment of the invention.

FIG. 1 illustrates one embodiment of a gaming machine or device 100 at which a viral gaming event or feature of one embodiment may be presented. The gaming machine 100 might be located in various environments, such as a casino.

In one embodiment, the gaming machine 100 defines a generally enclosed interior space for housing one or more components. As illustrated, the gaming machine 100 generally comprises a housing or cabinet 102 for supporting and/or enclosing various components required for operation of the gaming machine. In the embodiment illustrated, the housing 102 includes a door located at a front thereof, the door capable of being moved between an open position which allows access to the interior, and a closed position in which access to the interior is generally prevented. The configuration of the gaming machine 100 may vary. In the embodiment illustrated, the gaming machine 100 has an "upright" configuration. However, the gaming machine 100 could have other configurations, shapes or dimensions (such as being of a "slant"-type, "bar-top" or other configuration as is well known to those of skill in the art).

The gaming machine 100 preferably includes at least one display device 104 configured to display game information. The display device 104 may be a mechanical, electro-mechanical or electronic display, such as one or more rotating reels, a video display or the like. When the display device 104 is an electronic video display, it may comprise a cathode ray tube (CRT), high resolution flat panel liquid crystal display (LCD), projection LCD, plasma display, field emission display, digital micro-mirror display (DMD), digital light processing display (DLP), multilayer LCD display, an E-ink display, a light emitting display (LED, OLED) or other suitable displays now known or later developed, in a variety of resolutions, sizes and formats (e.g. 4:3, widescreen or the like). The display 104 may be capable of projecting or displaying a wide variety of information, including images, symbols and other indicia or information associated with game play, game promotion or other events. The gaming machine 100 may include two or more display devices. For example, a secondary display device might be associated with the housing or cabinet 102 along with the main display device 104, or might be associated with a top box or the like, as illustrated in FIG. 1.

The gaming machine 100 may be configured to present a wide variety of games. Such games might be Class III type games such as slot games and video poker games, or Class II type games such as bingo, pull-tab games, lotto or instant lottery style games. In one embodiment, certain game outcomes may be designated as winning outcomes. Prizes or awards may be provided for winning outcomes, such as monetary payments (or representations thereof, such as prize of credits), or the like. As detailed below, one or more of the awards may have certain characteristics or features.

The gaming machine 100 also preferably includes one or more player input devices 108 (such as input buttons, plunger mechanisms, a touch-screen display, joystick, touch-pad or the like) that may be utilized by the player to facilitate game play. Also included in the player input devices 108 is a means for accepting monetary value. As illustrated in FIG. 1, a coin accepting mechanism 112 may be provided for accepting coins and a currency or bill acceptor 114 may be provided for accepting cash or paper currency, or a ticket reader may be provided for accepting and reading tickets or other representations of cash or currency. It is contemplated that other mechanisms may be provided for accepting a payment, such as credit card, ticket readers or input devices whereby a player may have funds paid from a remote account.

In one preferred embodiment, the gaming machine 100 includes a microprocessor or controller (not shown) for controlling the gaming machine, including receiving player input and sending output signals for controlling the various components of the machine 100 (such as generating game information for display by the display 104). The controller may be arranged to receive input such as a purchase/bet signal when a purchase/bet button is depressed, and a currency insert signal when a player inserts bills or coins. The controller may be arranged to send signals for determining winning combinations, for causing the coin hopper/dispenser, or printer, or an electronic fund transfer (EFT), to pay winnings, and to cause the display to display winning amount information. In addition, the controller is preferably arranged to determine if a round of game play has resulted in a win, and if so, the prize to be awarded to the player for that win.

The controller may be configured to execute machine readable code or "software" or otherwise process information, such as obtained from a remote server. Software or other instructions may be stored on a memory or data storage device. The memory may also store other information, such as pay table information. The gaming machine 100 may also include one or more random number generators for generating random numbers for generating random game outcomes, or such might be located remotely. For example, if the gaming machine 100 is a stand-alone machine configured to present a slot game or a video poker game, the random number generator(s) might be located at the machine. However, if the gaming machine 100 is used to present server-based or networked games, such as bingo games, the random number generator(s) might be located at the server.

In operation, the player may initiate game play by providing value, such as a wager. The wager may be made by activating one of the player input devices 108 such as a one credit button 116 which places a single credit purchase or wager or a max credit button 118 which places a maximum purchase or wager for that round of game play. The maximum purchase or wager is commonly defined as playing or betting an amount comprising a multiple of the value of a single purchase or wager up to a predefined upper purchase or bet limit or threshold. When the player actuates either the one credit button 116 or the max credit button 118, a wager is placed or purchase is made in that amount and the player's credit base is decreased by the number of credits wagered. The player's remaining credit base is typically displayed to the player by way of the display device 104. Upon making a purchase or placing a wager, the game may begin automatically or the player may join a game already in progress, or the player may initiate the game by activating another player input device, upon which the gaming machine 100 presents one or more game elements which are used to determine if the player has received a winning combination.

The gaming machine 100 generally includes a means for awarding a player a prize or winnings accumulated during game play. When a player obtains a winning outcome, the player is preferably paid prizes or awards in the form of stored credits, the amount of which is indicated to the player on the display 104. A "cash out" button may be provided for permitting a player to be paid the winnings or redeeming any credits initially paid into the gaming machine 100. The term "cash out" is used herein to define an event initiated by the player wherein the player receives a number of coins or currency that is equivalent to the value of the player's accrued credit base.

Typically, when a player cashes out, the gaming machine 100 is configured to dispense a media or voucher, such as via a printer 114, which represents the cash-out value. The player may utilize this voucher at other gaming machine or convert the voucher to currency, such as at a cashier's station. However, depending upon the configuration of the gaming machine 100, the player might receive a cash or coin disbursement. For example, the gaming machine 100 might be configured to activate a coin hopper or coin handling device (not shown) which physically counts and delivers the proper number of coins to the player. The coin handling device is commonly configured to transport coins from a supply source (hopper or bin filled with coins) to a coin tray 124 or payout receptacle where the player physically receives the coins.

As indicated above, the gaming machine 100 may be configured as a stand-alone device, such as when the machine is configured to present a slot game or a video poker game. As detailed below, however, the gaming machine 100 may be a server-based or networked machine. For example, the gaming machine 100 may be configured to obtain game code or game outcome information from a remote server 130. The gaming machine 100 may also communicate with a remote accounting server and/or player tracking server, as is well known in the art.

It will be appreciated that the gaming machine and system described and illustrated in FIG. 1 is only exemplary of an environment for a game according to one embodiment of the invention. For example, it is possible to implement the events or features of the embodiment via other types of gaming devices, such as computing devices such as home and laptop computers, including in an on-line, web-based environment. Additionally, a gaming machine or device 100 could take the form of a gaming table, a kiosk, iTV, a set-top box, or various mobile devices (such as a smart phone, PDA, media player, or tablet computer), etc.

One aspect disclosed herein is a viral gaming event or feature. Such an event may be presented at a gaming machine or device 100 such as described above.

The viral gaming event of an embodiment has two primary components: a viral gaming event trigger and viral gaming event spread or transmission. The viral gaming event is initiated by a trigger. The trigger may be random and/or be a particular event. For example, the trigger may be generated randomly at a server or a gaming machine. Alternatively, the trigger might occur when a particular game result occurs. Such an outcome might be the appearance of a particular symbol or a group of symbols, one or more winning game outcomes, certain non-winning outcomes, or various other events at a gaming machine or groups of gaming machines. Other events might comprise a certain number of credits wagered or a certain number of games played at a gaming machine or across a gaming system, or a group of symbols or outcomes received at a bank, or a jackpot received at one or more gaming machines, or a predefined time, place, or machine designated by the casino manager, for example.

Upon the trigger, the viral gaming event is initiated at one or more first gaming machines. Initiation of the event at a gaming machine is akin to "infection" of the machine with the viral gaming event. In one embodiment in which the trigger is a particular event at a gaming machine, the viral gaming event is initiated at that gaming machine. However, the event might be initiated at more than one gaming machine, such as gaming machines spread across the floor of a casino, the gaming machines of a bank of gaming machines or the like. Another salient characteristic is that the viral gaming event can "hop" to other qualified games or machines even before the event is consummated at the "infected" game or machine. Like a biological flu, this viral propagation during the incubation period speeds up the propagation and create more excitement for the players because of the multiple potential payouts that overlap and sequentially occurring all around the players. Even when multiple games are being played simultaneously at one gaming machine, the concurrent games can be susceptible to "infection" if they meet the criteria.

The viral gaming event may be coupled with or comprise content related to any number of events. For example, the viral gaming event might comprise a game, a bonus event, a secondary game or the like. Other contents such as a notification of a $3^{rd}$-party sponsored prize, a bonus alert, a promotional message, an advertisement, a group message, music, video, and the like can also be coupled with a viral gaming event. The viral gaming event might be the same for each gaming machine regardless of the type or manufacturer of the gaming machine. For example, the viral gaming event might comprise a particular animated bonus event, regardless of whether the gaming machine is a spinning reel slot machine or video poker machine. In other embodiment, the viral gaming event might vary depending upon the gaming machine, the game being played, the player, time, and/or other parameters. For example, the viral gaming event might comprise a bonus opportunity for a 1000 credit payout. At a video poker machine the viral gaming event might be presented as a poker game having the opportunity for a 1000 credit payout if a particular win is achieved, while at a slot machine the viral gaming event might be presented as a spin of the reels with the opportunity for a 1000 credit payout if a particular symbol or combination of symbols is achieved. The configuration of a game on a gaming machine can also cause a variation of viral gaming event. For example, a viral gaming event may present an opportunity for a player of a gaming machine to win a $10,000 progressive jackpot (a traveling progressive) at a $5-denominated slot game, and may present a $1,000 jackpot at a $0.25 denominated game. Such a traveling progressive jackpot offers a player of the infected gaming machine a limited time (the infection period) to win a portion of its funds, scaled up or down proportionately with the amount that a player bets.

The viral gaming event might comprise a single player/machine event or it might comprise a group play type event. In a group play implementation, a community bonus event could cause multiple viral bonus events to be subsequently generated at nearby slot machines associated with the group game. For example, when a community bonus wheel is spinning in a group game, it could generate a viral bonus event that "infects" nearby associated gaming machines and cause them to have bonus spins at a later time. The viral gaming event continues to hop or spread to other qualified games until a termination event occurs. Also, the viral gaming event might result in an award, such as a bonus award, or it might have one or more outcomes that do not result in any additional award. The value of the awards that may be won at a particular machine may be based upon the size of player's wager, a side wager, a random event, or the like.

The viral gaming event may be presented via the main display of a gaming machine, via a secondary display or by one or more displays or devices common to one or more gaming machines. The viral gaming event might require one or more player inputs. The viral gaming event might be presented without a requirement for a further wager or might require a player to place a wager or an additional wager. In one embodiment, a player may be required to place a side wager in order to be eligible for the viral gaming event to spread to their machine.

In accordance with the embodiment, the viral gaming event preferably spreads from one or more first gaming machines to one or more other gaming machines over time. In particular, after the viral gaming event is initiated at the one or more first gaming machines at a first time T1, it spreads to and is initiated at one or more additional gaming machines at a time T2. The time delay between when the viral gaming event is initiated at the one or more first gaming machines and the one or more additional gaming machines may vary. For example, the time delay could be very short (seconds) or long (minutes, hours, etc.).

In addition, the viral gaming event may spread beyond one or more second gaming machines to other gaming machines. As one example, the total number of gaming machines "infected" over time may be bell curved (i.e. one or more gaming machines at time T1, increasing to a higher number of gaming machines at a time T2 and then decreasing to a fewer number of machines at a time T3). The number of gaming machines which are infected may also be random or have various other patterns, such as increasing linearly, geometrically, or exponentially over time until an end time.

It will also be appreciated that the rate of spread of the viral gaming event may vary. For example, the viral gaming event may spread from one or more first gaming machines at a time T1 to one or more second gaming machines in a time T2, and from the one or more second gaming machines to one or third gaming machines in a time T3, where the time intervals between T2/T1 and T3/T2 differ.

In one embodiment, the viral gaming event preferably ends or stops spreading at some point in time. When the viral gaming event ends, it preferably no longer spreads to additional gaming machines. The spread of the viral gaming event may end after a certain number of gaming machines have been infected, after a period of time from when the one or more first gaming machines were infected, until a pool of award money has been exhausted, or based upon various other criteria. In a preferred embodiment, the viral gaming event ends before all gaming machines in a particular location or environment are infected, whereby the viral gaming event is perceived as a special or bonus event as to those machines which receive it (compared to those which do not).

The viral gaming event may end at a particular machine once the event has been played or presented at that machine (though the event may still be spreading to other machines and/or games before the consummation of the viral gaming event at the current gaming machine/game). If the viral gaming event has a long duration, such as a group-type event, then the viral gaming event might end at each machine at a termination time. For example, once a viral gaming event is initiated at a gaming machine it may continue until the entire viral gaming event is terminated at all machines, as detailed below.

Once each gaming machine is infected, the viral gaming event is presented at that gaming machine. As indicated, the viral gaming event which is presented at each machine may be unique (i.e., tailored to a player or a game), or may be similar the event presented at other gaming machines.

Figure 2:
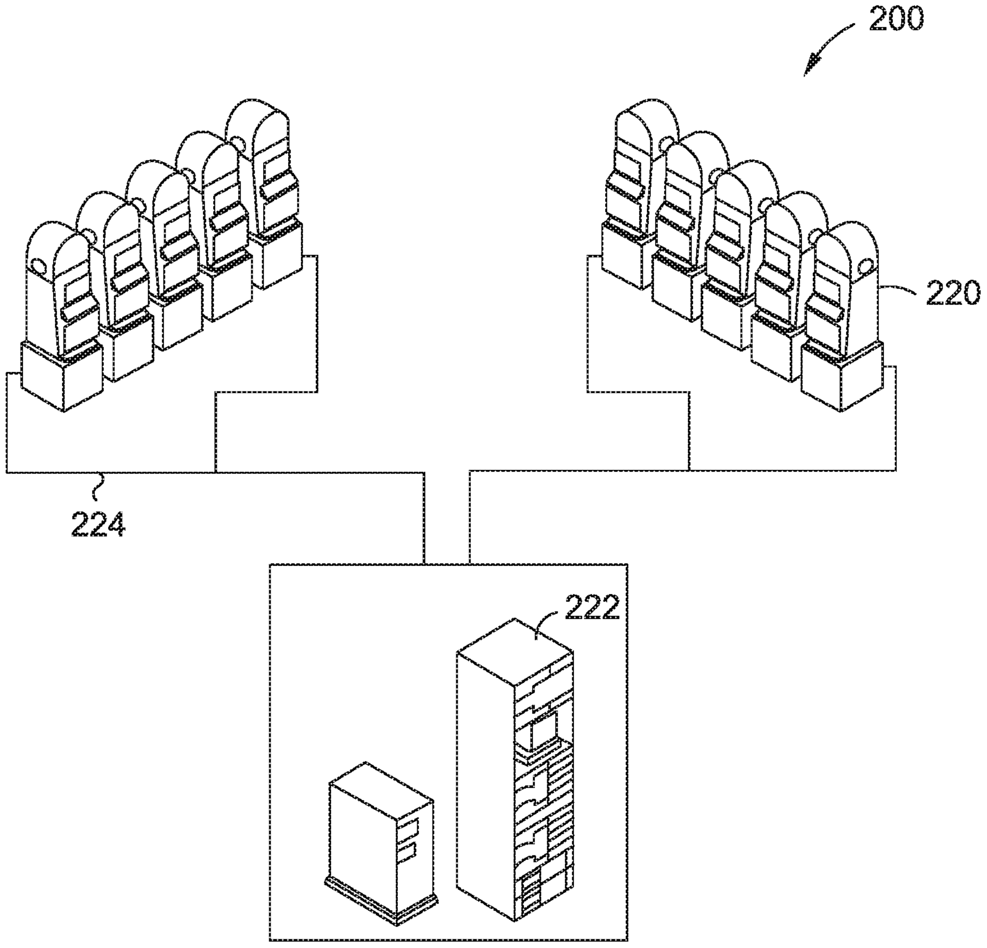
FIG. 2 illustrates a gaming system configured to present viral gaming events.

In a preferred embodiment, the viral gaming event is implemented in a gaming system including multiple gaming machines. Preferably, the event is controlled by one or more system controllers. The system controller might comprise a server which is in communication with the gaming machines. FIG. 2 illustrates one embodiment of such a system 200. The system 200 includes a plurality of gaming machines 220. Those gaming machines 220 may have the same or different configurations, may be produced by the same or different gaming machine manufacturers and may be configured to present the same or different games. The gaming machines 220 might be located, for example, in the same area of a casino, in various areas of a casino, or in multiple casinos (or other locations). The gaming machines 220 may be arranged in various configurations. As illustrated, various of the gaming machines 220 may be arranged into rows or banks, but they might also be arranged in other fashions. While in some arrangements the propagation may depend on or be linked to the physical arrangement of the gaming machines, such as not necessary. For example, in the case of mobile devices, such devices might just have to be at the right place at the right time, or possess the right viral triggering characteristics in order for the viral event to spread to them.

The system 200 preferably comprises a controller or server 222. The server 222 may comprise a computing device configured to execute machine readable code. In a preferred embodiment, the server 222 is in communication with the gaming machines 220 via one or more communication links 224. Such links 224 might comprise wired or wireless links, or combinations thereof.

In one embodiment, the server 222 may initiate a viral gaming event trigger. For example, the server 222 might monitor coin-in/credit wager data at the gaming machines 220. If a certain threshold is met, the server 222 may initiate the viral gaming event. Following the decision to instantiate the viral gaming event, the server 222 may determine a propagation pattern, one or more seed gaming machines, and the direction and rate of propagation. The server 222 might select one or more gaming machines 220 at which the event is to be initiated. The server 222 might receive feedback that the triggers that took place, and then spread the viral gaming event to other gaming machines 220.

In another embodiment, a viral gaming event might be triggered at a gaming machine or machines 220. The server 222 is then notified of the triggering event. The server 222 might then determine the propagation pattern, and spread the viral gaming event to other gaming machines 220. This is a hybrid implementation in which the triggering event is initiated by a game or gaming machine and then propagates by a server.

In one embodiment, the server 222 might utilize an existing communication network which links the gaming machines 220, such as a player tracking or accounting system. However, in environments where gaming machines are associated with different systems (such as those of different manufacturers), the server 222 might communicate with each of those different gaming machines via other communication links. Such links might be direct to the gaming machines or might be via the servers of the other systems. If the game or gaming machine supports a standard communication protocol, no protocol translation is needed. However, if the game or gaming machine does not support a standard protocol, a protocol mediator server may be needed to translate the communication commands to the language that the gaming machine supports.

It is also possible for the viral gaming event to be presented by gaming machines in a peer-to-peer environment. In this configuration, each gaming machine may be configured with a viral gaming event application. Each application may determine if a viral gaming event trigger has occurred. If so, that gaming machine may initiate the viral gaming event and then send a message directly to one or more other selected gaming machines to spread the viral gaming event. In a peer-to-peer communication approach, the triggering event takes place at a game and then propagates directly to other qualified games or gaming machines without the need for a central server. A manual approach in which a casino manager initiates the triggering event can take place whether the viral gaming event is constructed via a client-server or a peer-to-peer architecture.

A variety of additional aspects will now be described.

In one embodiment, spread of the viral gaming event may be random. In other configurations, it may be controlled, such as based upon various criteria. For example, the viral gaming event may be spread from one or more first gaming machines to other gaming machines that have or are experiencing a lower rate of game play. A player tracking or other system may be used to monitor game play at gaming machines across a system. Certain machines, such as in certain areas of a casino, may experience lower rates of play. This information may be provided to the viral gaming event server and the viral gaming event server may cause the viral gaming event to be initiated at or spread to those machines. The viral gaming event may thus be used as a tool to entice players to play gaming machines which are otherwise not being played.

Patterns of infection or rates of infection may also be varied by other factors. For example, the spread of a viral gaming event may be a different rate during the day versus night, or during periods of high gaming activity versus low activity.

In another embodiment, other sensors or devices may be used to provide information to the viral gaming event system for use in controlling the spread of the viral gaming event. For example, instead of using game play information from a player tracking system, the viral gaming system might obtain information from one or more cameras. These cameras may provide visual information regarding the gaming floor, such as information regarding patterns of patron movement, gaming machine occupancy and the like. This information may be analyzed and used by the viral gaming event server in determining the propagation of the viral gaming event. Such camera or other gathered information may also be used during the spread of the gaming event to determine if desired goals are being met (i.e. a feedback control) and, as detailed below, used to change various viral gaming event metrics during the event to achieve those goals.

The viral gaming server may utilize various control strategies. For example, the viral gaming server may employ a pre-programmed strategy in determining the viral gaming event. This strategy might comprise, for example, locating gaming machines which are inactive and spreading the viral gaming event to those machines. The control strategy might include a learning component. For example, the viral gaming event server may employ strategies and feedback in order to modify control strategies. Such strategies might be used and modified, for example, to achieve certain goals such as even player distribution across a gaming floor, maximized gaming machine occupancy or the like.

As one aspect of viral gaming event spread, different viral gaming events may be presented at different times and to different machines. As indicated above, different viral gaming events may be presented at different gaming machines. For example, viral gaming events offering differing levels of awards may be offered at different gaming machines, such as to manipulate play patterns. As one example, viral gaming events with low awards may be initiated at gaming machines that are active and viral gaming events with high awards may be initiated at gaming machines that are inactive (so as to attempt to draw new players to those inactive machines).

As indicated, the spread of the viral gaming event from machine to machine may be based upon various criteria or controls. As other examples, the viral gaming event might spread based upon a geometric progression (a randomly selected or predetermined geometric pattern). Such a pattern might comprise a propagation direction and rate of propagation. The viral gaming event might also spread to proximate gaming machines or the like. In another embodiment, the viral gaming event may spread to players in certain groups or meeting certain qualifications. For example, the viral gaming event may spread to all players having certain common metrics associated with the player tracking/profile information.

In one embodiment, the viral gaming event may only spread to gaming machines which are in active play or may spread based upon other criteria. For example, the viral gaming event might only spread to games where players have met certain qualifying requirements (such as duration of play, minimum player loyalty points, Gold Club members, etc.).

However, in other embodiments, the viral gaming event may spread to inactive gaming machines or may spread based upon other/external criteria than player qualification. As indicated, for example, the viral gaming event may be spread to gaming machines with a low level of game play. In the event a gaming machine is inactive, it is possible that the viral gaming event permits a player to achieve winnings without a wager. For example, a player might travel to a gaming machine which has been infected and the player may be permitted to play a bonus viral gaming event with the opportunity for winnings without any wager.

In one embodiment, when a gaming machine is infected with the viral gaming event (or the event is initiated at that gaming machine), notification may be provided to the player thereof and/or potential players via various messaging technologies. For example, various types of visible, audible or other alerts such as email, text messages to a player's mobile device (such as a phone or PDA) may be provided. Such alerts might comprise notification via the main display of the gaming machine, a secondary display, various lights or speakers. In one embodiment, the alert might comprise an audible notification that the gaming machine has been "infected". Preferably, such alerts can be used by players or potential players to track or monitor to the spread of the viral gaming event.

In one embodiment, path lighting or other elements might be used to display the spread of the viral gaming event. Path lighting in a floor, ceiling or the like may define multiple paths between gaming machines of a casino. The particular paths of spread may be illuminated, thus providing players with a visual indication of how the viral gaming event is spreading. Other types of alerts or indicators may be provided, such as laser light, sound propagation, synchronized vibration of the chairs, vibrating the player's mobile device, text messaging to the player's mobile device, and the like.

Figure 3:
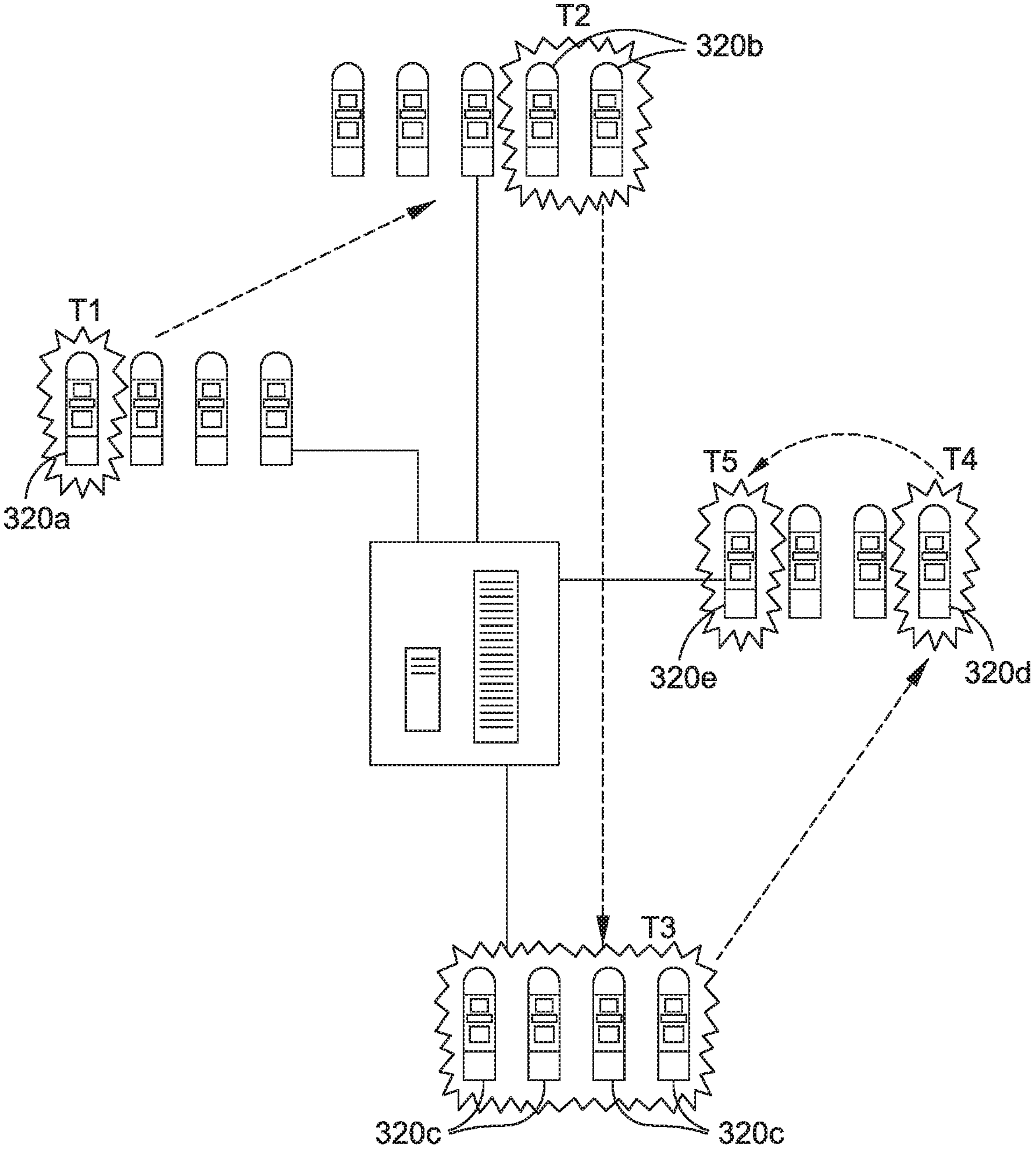
FIG. 3 illustrates propagation of a viral gaming event to multiple gaming machines.

FIG. 3 illustrates one example of propagation of a viral gaming event to multiple gaming machines. As illustrated, the viral gaming event was initiated at a single gaming machine 320*a*. An alert notifies any player of that machine and other players in the area that the viral gaming event has been initiated at that machine. The viral gaming event then spread to two more gaming machines 320*b* in a different location, then an entire bank of gaming machines 320*c* in yet another location, then to a single gaming machine 320*d* in yet another bank of gaming machines, and finally to a last gaming machine 320*e* in that same bank of gaming machines. Each time a gaming machine is infected and/or the viral gaming event is initiated at the gaming machine, an alert is preferably provided. In this manner, players can track the spread of the viral gaming event.

In one embodiment, it is possible for there to be a time delay between when a gaming machine is infected with the viral gaming event and when it is presented at the gaming machine. This might be referred to as an incubation period. For example, the viral gaming event might spread to one or more second gaming machines. An alert may be provided to the players thereof that the gaming machines have been infected. However, the viral gaming event itself might be presented immediately or after some period of time. In this manner, a player knows that the machine is infected and the viral gaming event will be presented, but does not know when. This entices the player to continue to play the gaming machine in anticipation of the viral gaming event being presented. During the incubation period, the viral gaming event may continue to propagate and infect other games. Thus, the viral gaming event may overlap at two or more games/gaming machines (as compared to an embodiment wherein the virus spreads sequentially and an event at one or more games/gaming machines must end before another event starts at other games/gaming machines).

As one aspect of an embodiment, viral gaming event data may be gathered and analyzed. Information may be gathered regarding the results of viral gaming events at each individual machine, the number of viral gaming events initiated vs. those which were played (i.e. were inactive machines played when the event was initiated at the machine), etc. This information may be used to determine how future viral gaming events are initiated or spread, the awards to be offered and the like.

It will be appreciated that the various features disclosed herein may be utilized in various combinations. For example, the viral gaming event may be configured to spread at differing rates over time, coupled with feedback control which causes the viral gaming event to spread to particular gaming machines based upon rate of game play. Further, multiple viral gaming events can occur on a casino floor, allowing such hybrid events as a game being infected with more than one viral gaming event at one time. This allows the player to be eligible for multiple bonuses, for instance.

In accordance with the aspect, numerous advantages are realized. The aspect substantially increases the excitement of playing games, including wagering games. In particular, players know that a bonus or other gaming event which is additional to their base gaming event may be triggered and presented at any time. More importantly, even if such an event is not initiated at their gaming machine, if that event is initiated at another gaming machine it may still spread to their gaming machine. Once a gaming machine is infected, players can anticipate infection of other machines. Thus, substantial anticipation is created while the viral gaming event spreads through the various gaming machines.

An additional advantage of the viral gaming event is that it may be used to increase gaming play. Aside from the inherent excitement that the event presents, the viral gaming event may be particularly spread to gaming machines having low gaming activity. This spread may entice players to follow the spread of the viral gaming event to those machines. As players move to those machines, game play is increased on those gaming machines.

Another aspect disclosed herein concerns other embodiments in the context of a location-based real-time casino data system. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present aspect, the components, process steps, and/or data structures may be implemented using various types of operating systems, computing platforms, computer programs, and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 4:
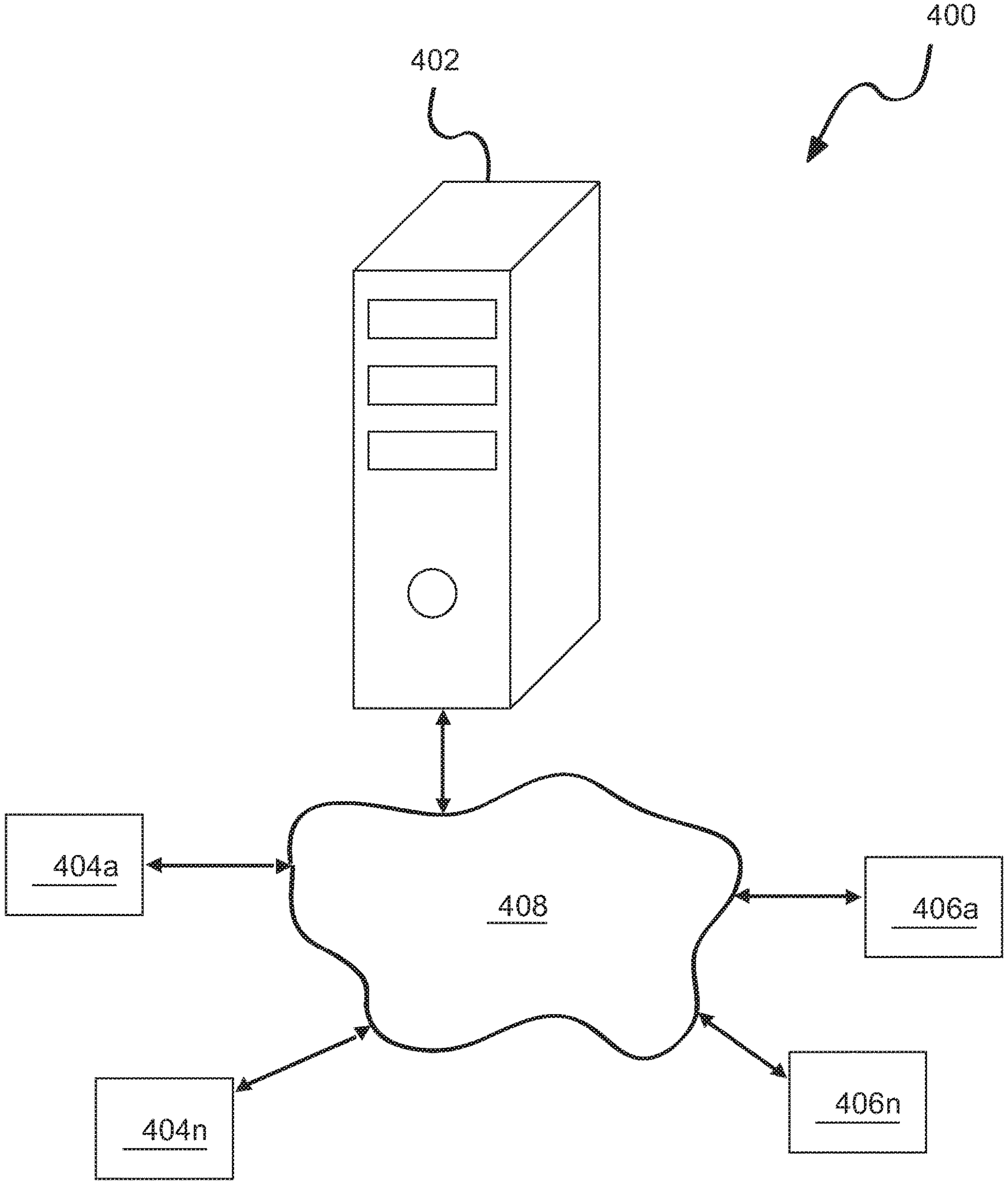
FIG. 4 illustrates a schematic diagram of a gaming system in accordance with one embodiment of the invention.

FIG. 4 illustrates a schematic diagram of a gaming system in accordance with one embodiment of the invention. The gaming system 400 comprises at least one gaming device 402, at least one portable electronic device 404*a*, 404*n*, at least one management portable electronic device 406*a*, 406*n* and a network 408. The network 408 can be accessible via any wired or wireless technology such as Bluetooth™, Wifi™, LTE, WiMax, Universal Serial Bus (USB), or Ethernet. The at least one gaming device 402 can be a gaming machine, for example a slot machine, a mobile device, a smart phone, a tablet computer, a game table, or a gaming server. The at least one gaming device 402 can be configured to periodically store and update real-time casino data. The at least one portable electronic device 404*a*, 404*n* can be configured to communicate with the at least one gaming device 402 via the network 408. The at least one management portable electronic device 406*a*, 406*n* can be configured to communicate with the at least one gaming device 402, as well as the at least one portable electronic device 404*a*, 404*n*, via the network 408. The client and management portable electronic devices 404*a*, 404*n*, 406*a*, and 406*n* can be configured to indicate each respective location and transmit its location to the gaming device 402. The client and management portable electronic devices 404*a*, 404*n*, 406*a*, and 406*n* can also acquire the real-time casino data from the at least one gaming device 402 as well as from each other (peer-to-peer manner) based on the location of each portable electronic device 404*a*, 404*n*, 406*a*, and 406*n*.

In another embodiment, the at least one gaming device 402 can be configured to detect the location of each portable electronic device 404*a*, 404*n*, 406*a*, and 406*n*, and transmit the real-time casino data to the at least one portable electronic device 404*a*, 404*n*, 406*a*, and 406*n* based on the location, access privilege, preset personal preference, spontaneous preference, etc., of the at least one portable electronic device 404*a*, 404*n*, 406*a*, and 406*n*. The at least one gaming device 402 can be configured to periodically receive and update the location of the at least one portable electronic device 404*a*, 404*n*, 406*a*, and 406*n*.

Figure 5:
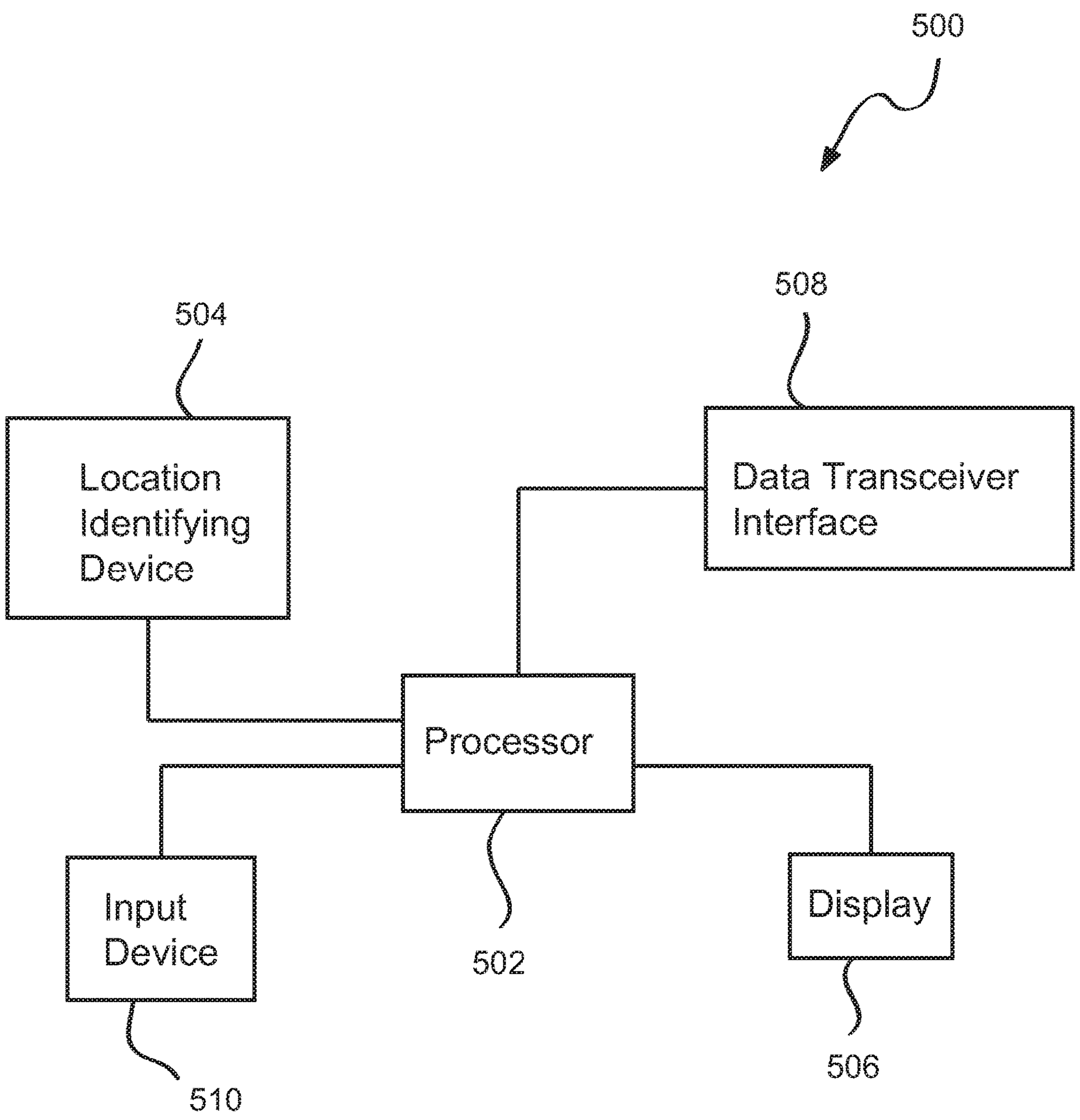
FIG. 5 illustrates a block diagram of a portable electronic in accordance with one embodiment of the invention.

FIG. 5 illustrates a block diagram of a portable electronic device 500 in accordance with one embodiment of the invention. The portable electronic device 500 can have a location-identifying device 504 configured to indicate a location of the portable electronic device when the portable electronic device is outdoors or indoors. In one embodiment, the location-identifying device 504 can include a location acquisition unit (hardware or software based) configured to acquire a location data of the portable electronic device, such as Cartesian coordinates within a casino establishment environment, latitude, longitude, distance, angle, orientation and the like.

For example, the location acquisition unit may acquire the location of the portable electronic device by using radio frequency (RF) wireless location tracking between the portable electronic device and at least one wireless access point distributed throughout the gaming establishment environment. In another example, an RF transceiver within the portable electronic device may be located by its position relative to the closest access point. In yet another example, triangulation or trilateration methods may be used in conjunction with multiple stationary access points to determine the location of the portable electronic device. RF fingerprinting location appliances, such as the Cisco Wireless Location Appliance™ manufactured by Cisco Systems, Inc. (San Jose, California, US), may be used to determine the location of the portable electronic device. RF fingerprinting may further refine the location data associated with the portable electronic device by comparing the live-captured RF characteristic of the current location of the portable electronic device to a known or predicted RF characteristic of a point or zone within the gaming establishment environment. In another example, location data may be determined visually by a plurality of smart cameras distributed throughout the gaming establishment environment. The smart cameras may recognize the portable electronic device by, for example, reading a 2D barcode displayed on the portable electronic device's display, and tracks its location and movement within the gaming establishment environment based on known location data of barcode reader, or nearby fixed objects. Using the portable electronic device to scan for nearby RF beacons and simply decodes their location is yet another method used when exact location is unnecessary.

The portable electronic device 500 can further comprise an authentication device configured to verify and authorize data access privileges of the portable electronic device 500's software application. In one embodiment, the authentication device can be a casino data access server configured to authenticate the software as well as verify and authorize access privileges of a software application. The portable electronic device 500 can transmit the user identifier code and the software application's digital signature information to a server for authentication and verification. When the portable electronic device transmits encrypted device identifier, user identifier, software digital signature, and other information to the server, the server is configured to decrypt the message and identifier information. The server then checks for correct values of the user identifier code, the software application's authenticity, and/or the device's identifier information.

The portable electronic device 500 further includes a processor 502 configured to receive real-time casino data associated with the location of the portable electronic device 500. The portable electronic device may further include a display 506 configured to present the real-time casino data. In one embodiment, the real-time casino data includes at least one gaming device data associated with the location of the portable electronic device 500. The gaming device maybe a slot machine, a table game, for example, blackjack, poker, craps, and the like, a mobile device, a smart phone, a computer, a tablet computer, and/or an interactive TV (iTV).

The portable electronic device 500 can also include at least one input device 510 configured to allow navigation of the real-time casino data. The input device 510 can include, but is not limited to, a plurality of buttons, a keyboard, a touch screen display, voice, gesture, and the like. The portable electronic device 500 can also include a data transceiver interface 508 configured to transmit data, including but not limited to, real-time casino data, authentication or verification data or both, and the like.

In one embodiment, the processor 502 can be configured to operate with the casino data application to receive real-time casino data associated with the location, access privileges, preferences, and/or spontaneous preferences of the portable electronic device 500. The casino data application may further organize and/or prioritize the real-time casino data according to the preferences of the player, of the casino, of a third-party sponsor of the application data, of the location of portable electronic device, or some combination of these. In another embodiment, the processor 502 can be configured to interact with a casino data center to receive real-time casino data associated with the location, access privileges, preset preferences, and/or spontaneous preference of the portable electronic device 500. The casino data application may further organize and/or prioritize the real-time casino data according to the preferences of the player, of the casino, of a third-party sponsor of the application data, of the location of portable electronic device, or some combination of these.

The casino data center can be configured to receive and store the gaming machine information transmitted from all gaming machines in the casino. The casino data center can also be configured to store data associated with the connection, history, operating states of hardware and software, and the session data with the portable electronic devices. Such a back-up storage capability helps in restoring an interrupted communication session between the casino data center and the portable electronic devices due to unforeseen events such as loss of battery power, loss of signals, corrupted memory, inadvertent delete, etc., on the portable electronic devices. In such a recovery process, the entire session is restored to the last known state (display, memory stack, communication, operating system, applications, data, history, input, output, etc.) on the portable electronic device using backup data from the casino data center. A new location data acquisition is performed. An opportunity to update the data, based on current location, is then offered to the user. Thus, the user is afforded an option to continue the previous session, or to start anew.

In yet another embodiment, the processor 502 can be configured to present a visual representation of a particular gaming zone on the display 506. A zone maybe a physical area or volume of the casino where one or more gaming devices or points of interest that share some common characteristics exist for at least a time period. For example, penny slots zone, high-limit gaming zone, poker zone, mystery bonus zone, and the like. In another illustrative example, the entire second floor of a casino can be a mystery bonus zone on Tuesdays. A zone may also be a virtual area/space where physically separated gaming devices maybe logically grouped for a common function or purpose, such as a slot tournament, group games, bonusing, progressives, and the like. Whether a zone is a physical location with gaming devices, or a logical group of gaming devices, a zone may have its own server dedicated to serving that zone and the gaming devices connected to it. The advantage of zone-based architecture is that the location services can be deployed in a piecemeal manner and scale up one zone at a time. Such a distributed architecture could be more desirable than a monolithic architecture of a property-wide location-based service. Another advantage is that the precise location of a device is not required once a portable electronic device is determined to be within a zone. As long as the portable electronic device is somewhere inside the zone, zone-based service and data can be provided. Precise location is no longer required, lowering the cost of a location tracking system.

In one embodiment, the visual representation includes at least one indicator configured to identify at least one gaming machine based on at least one criterion, such as an access privilege. The indicator may be any visual representation such as an icon, a picture, a border around an object of interest, a descriptive text string, a visual pattern unique to the gaming machine or particular gaming zone, and the like. In one embodiment, the indicator is a semi-transparent object overlaying a region of interest in a background image. For example, a computer-generated semi-transparent mask overlaying a small area of the casino floor, highlighting a slot machine that is currently unoccupied and available players. The visual representation can be a line map, or a video camera image of a casino floor, or a hybrid representation where the line map overlays a still or a video camera image, identifying at least one gaming machine. In another embodiment, Augmented Reality technology, where one or more computer generated indicators are superimposed over a live video camera image, could be implemented. In this case, the player points the portable electronic device (equipped with a camera) in the general direction of interest. The video stream is analyzed, recognized, annotated and displayed, live, on the portable electronic device. As the player moves around the casino floor, annotations of gaming machines or other points of interest are dynamically updated.

Figure 6A:
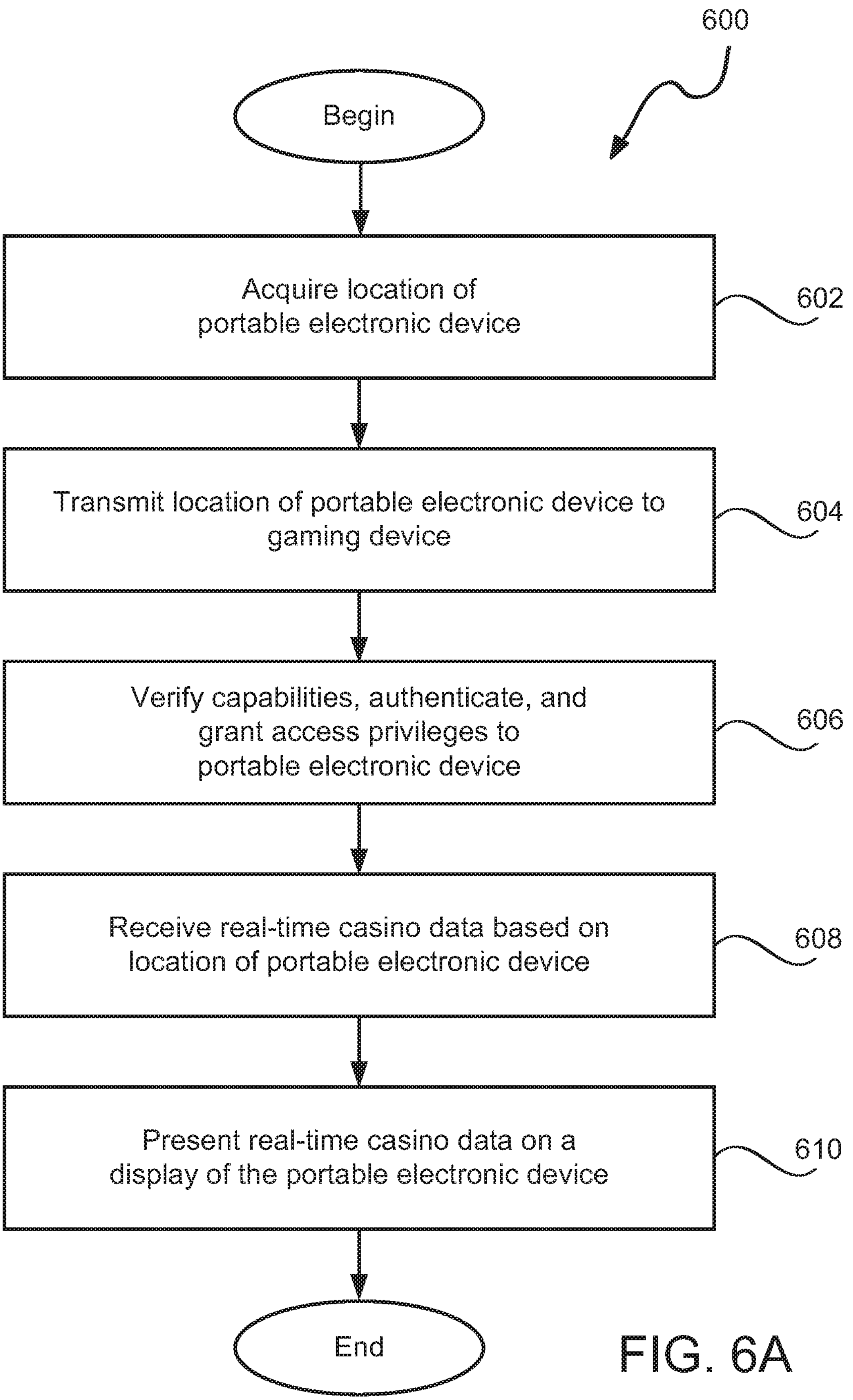
FIG. 6A illustrates a flow diagram of a method for acquiring real-time casino data.

FIG. 6A illustrates a flow diagram of a method for acquiring real-time casino data. A location of at least one portable electronic device can be calculated at 602. The location of the at least one portable electronic device can then be transmitted to a gaming device at 604, wherein the gaming device can be a slot machine, a central gaming server, or any other device. In one embodiment, the location of the portable electronic device can be associated with a predefined zone of the casino floor.

The method further includes verifying the capabilities, authenticating and granting data access privileges to the portable electronic device's software application at 606, receiving real-time casino data based on the location and capabilities of the portable electronic device at 608, and presenting the real-time casino data on a display of the at least one portable electronic device at 610. Capabilities of the portable electronic device include screen display size, screen resolution, computing capability, memory available, operating system type, software installed, and the like.

In one embodiment, the method further comprises periodically updating the location of the portable electronic device, transmitting an updated location of the portable electronic device to the gaming device; and receiving updated real-time casino data based on the updated location, preset preferences, spontaneous preferences, and access privileges of the portable electronic device.

In another embodiment, the presenting at 610 further comprises identifying at least one gaming machine that is generating revenue over a predetermined period of time. In yet another embodiment, the presenting further comprises displaying a visual representation of the predefined zone within the casino floor. Prior to presenting the real-time casino data on the display of the portable electronic device, the data may be organized and/or prioritized according to the preference of the user, of the casino, of a third-party sponsor of the application data, of the location of the portable electronic device, or some combination of these. In still another embodiment, the visual representation includes at least one indicator configured to identify at least one gaming machine based on at least one criterion. The visual representation can be a line map, or a video image of the casino floor, or a hybrid representation where the line map overlays a still or video camera image, identifying at least one gaming machine based on at least one criterion.

The real-time casino data may include gaming machine data. In one embodiment the gaming machine data includes pay-in data acquired over a predetermined period of time, pay-out data acquired over a predetermined period of time, game session duration data, or player entertainment preferences and play history. In another embodiment, the real-time casino data can be associated with the predefined zone of the casino floor. Real-time casino data acquisition maybe periodically updated and/or prioritized when a triggering event occurs, such as when the user moved to a different zone, at a predetermined time interval, when the user manually requests a data refresh, and the like. Using the acquired data, a casino manager may evaluate a player's value to the casino, and may award spontaneous perks such as cash back, bonus spins, food/drink vouchers, etc.

Figure 6B:
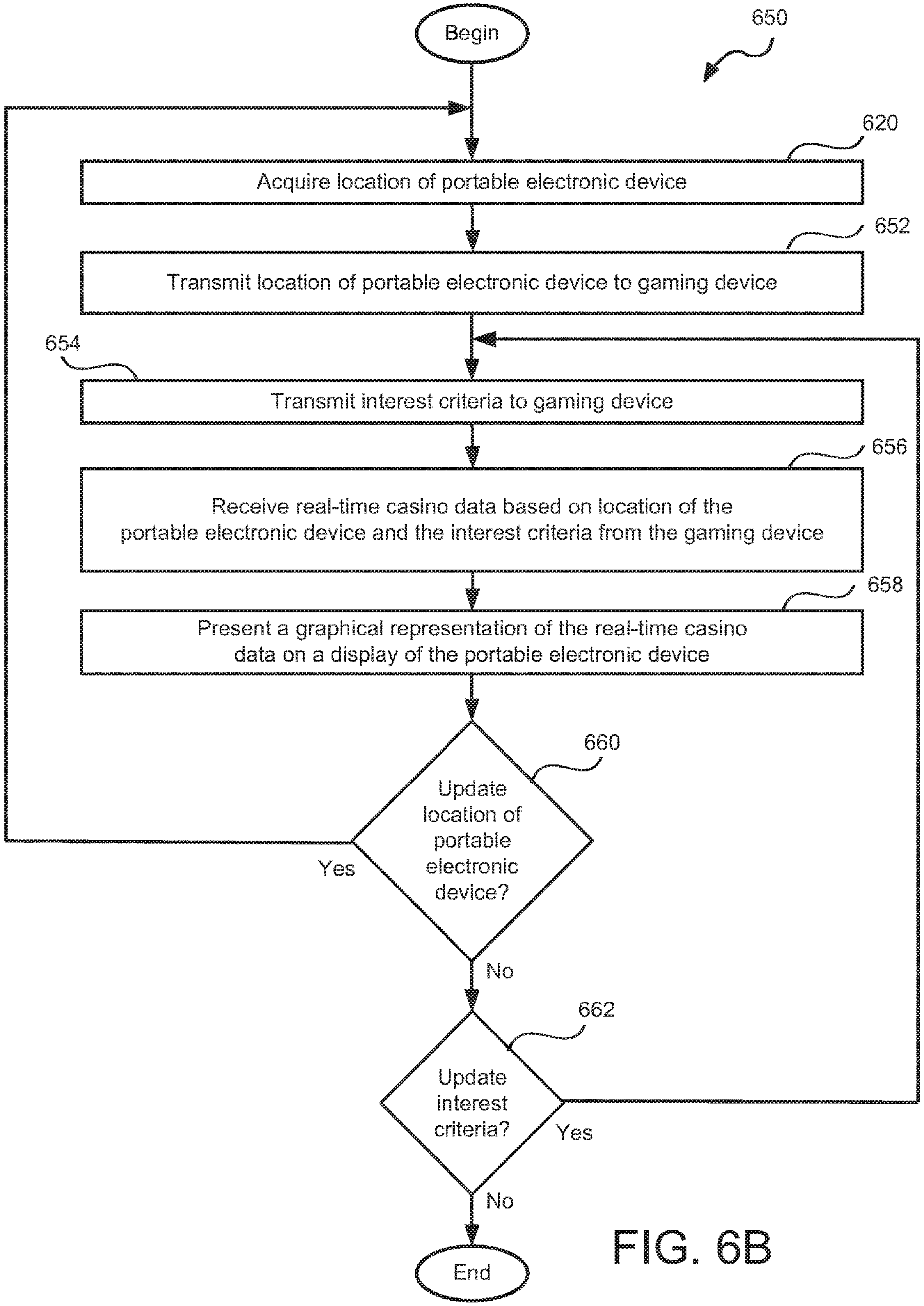
FIG. 6B illustrates a flow diagram of another method for acquiring real-time casino data.

FIG. 6B illustrates a flow diagram of another method 650 for acquiring real-time casino data. The method 650 comprises calculating a location of at least one portable electronic device at 620, transmitting the location of the at least one portable electronic device to a gaming device at 652, transmitting interest criteria to the gaming device at 654, receiving real-time casino data based on the location of the at least one portable electronic device and the interest criteria from the gaming device at 656, and presenting a visual representation of the real-time casino data on a display of the at least one portable electronic device at 658. Prior to the step of displaying, preprocessing maybe carried out to organize and/or prioritize the real-time casino data according to the preference of the user, of the casino, of a third-party sponsor of the application data, of the location of the portable electronic device, or some combination of these. The preference maybe preset or spontaneous.

The location of the at least one portable electronic device at 660 may be periodically updated as described above. After the updated location of the portable electronic device is calculated, the updated location of the at least one portable electronic device may be transmitted to a gaming device at 652 and the remaining steps of the method 650 may repeat thereafter. If there is no updated location of the portable electronic device at 660, then detect whether there are any updated interest criteria at 662. If there is updated interest criteria, the updated interest criteria may be transmitted to the gaming device at 654 and the remaining steps of the method 650 may be repeated thereafter.

From the player's perspective, interest criteria may include gaming machine data such as the time period since the most recent pay-out, gaming machines within a user-preferred predefined zone of the casino floor, gaming machines that share a particular theme, gaming machines that have linked progressives jackpots, a predefined zone of the casino floor having a particular denomination, and the like. From the casino operator's perspective, interest criteria may include players who have spent $50 or more in the last hour, winning players, losing players, gaming machines that generated the least revenue in the past month, top 10 games that received the most plays this week, players who have been at one machine for at least one hour, zones that are most active right now, and the like.

Figure 7A:
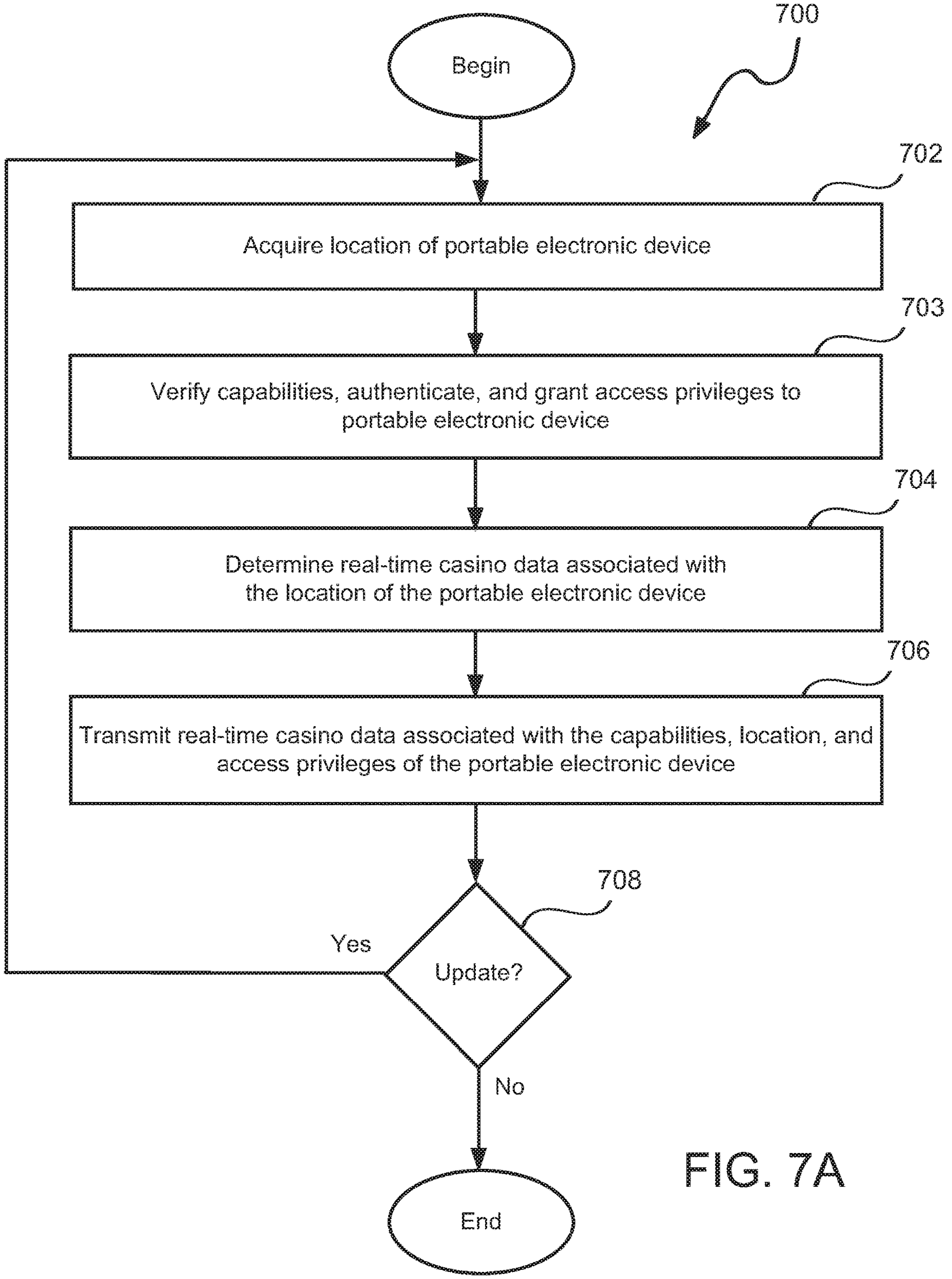
FIG. 7A illustrates a flow diagram of a method for acquiring and updating casino data based on the location of a portable electronic device.

FIG. 7A illustrates a flow diagram of a method for acquiring and updating casino data based on a location of a portable electronic device. The method 700 for acquiring and updating real-time casino data may be performed by acquiring a location of the portable electronic device at 702. In one embodiment, the location of the portable electronic device may be acquired using an indoor location identifying device within the portable electronic device, such as a RF location sensor (hardware, or software based). In another embodiment, the location of the portable electronic device may be calculated using radio frequency (RF) wireless location tracking between the portable electronic device and at least one wireless access point distributed throughout a gaming establishment environment. In yet another embodiment, an RF transceiver within the portable electronic device may be located by its position relative to the closest access point. In still yet another embodiment, triangulation or trilateration methods may be used in conjunction with multiple stationary access points to determine the location of the portable electronic device. For example, RF fingerprinting location appliances, such as the Cisco Wireless Location Appliance™ manufactured by Cisco Systems, Inc. (San Jose, California, US), may be used to determine the location of the portable electronic device. RF fingerprinting may further refine a position data associated with the portable electronic device by comparing a live-captured RF characteristic of a current location of the portable electronic device to a known or predicted RF characteristic of a point or zone within the gaming establishment environment. In another example, location data may be determined visually by a plurality of smart cameras distributed throughout the gaming establishment environment. The smart cameras may recognize the portable electronic device by, for example, reading a 2D barcode displayed on the portable electronic device's display, and tracks its location and movement within the gaming establishment environment based on known location data of barcode reader, or nearby fixed objects. Using the portable electronic device to scan for nearby RF beacons and simply decodes their location is yet another method used when exact location is unnecessary.

The location of the portable electronic device may be transmitted to a gaming device within the gaming establishment environment. The gaming device may be a central gaming server, a slot machine, a table game, a portable computer, a smartphone, a tablet computer, an interactive television, and the like. The gaming device that receives the location of the portable electronic device may then authenticate the portable electronic device as a member of the gaming establishment environment network and grant the portable electronic device access privileges sufficient to receive real-time casino data.

After acquiring the location information, a verification of the device capabilities, authentication of the device's software and authentication of the device's access privileges are performed at 703. Real-time casino data and access privileges associated with the location of the portable electronic device may be determined at 704 by the gaming device, transcoded to conform to the portable electronic device's inherent capabilities (display size and resolution, processing and storage capacity, etc.), and transmitted to the portable electronic device from the gaming device at 706. Prior to transmitting, the real-time casino data may further be organized and/or prioritized according to the preference of the user, of the casino, of a third-party sponsor of the application data, of the location of the portable electronic device, or some combination of these. The preference maybe preset or spontaneous. The real-time casino data associated with the location of the portable electronic device may include gaming machine data such as player gaming preferences, player entertainment preferences, gaming machine pay-in data acquired over a predetermined period of time, gaming machine pay-out data acquired over a predetermined period of time, and game session duration data. The gaming machine pay-in and pay-out data acquired over a predetermined period of time may be obtained from a central gaming server or recorded over a predefined period of time from a particular gaming machine of interest to a player.

The real-time casino data may be presented on a display of the portable electronic device. The real-time casino data may be displayed using text, graphical symbols, or augmented reality techniques. The displayed text, graphical symbols, or augmented reality techniques may indicate the location of a gaming machine that has characteristics which an individual player may find desirable. For example, the displayed real-time casino data may indicate the location of gaming machines that have recently paid out a jackpot, gaming machines that have not recently paid out, zones with most payout in the last hour, zones that offer mystery bonuses, and/or the location of particular themed gaming machines the player prefers such as Wheel of Fortune™. The real-time casino data presented on the display of the portable electronic device may also indicate a location of amenities and attractions within the gaming establishment environment, such as restrooms, concierge services, restaurants, shows, and the like.

The real-time casino data may be presented such that at least one gaming machine generating revenue over a predefined period of time may be identified. The gaming machine revenue generation data may also identify at least one gaming machine that has not generated revenue over the predefined period of time.

The augmented reality techniques that present the real-time casino data on the display of the portable electronic device may comprise overlaying a map of the gaming establishment environment, annotations and other indicators, onto real-time video captured and displayed by the portable electronic device. The overlaid map, annotations, and other indicators generated from the real-time casino data may indicate gaming machines that have desired characteristics, suggested rewards to casino managers for high value players, amenities within the gaming establishment environment and/or players that have generated a predefined amount of revenue for the casino, and the like. The overlaid map may be referred to as an augmented reality map, and the augmented reality map may be periodically updated when the portable electronic device acquires new real-time casino data and/or when the location, or other triggering events, of the portable electronic device changes as described below.

The real-time casino data associated with the portable electronic device may be periodically updated at 708. Several events may trigger updates of the real-time casino data associated with the portable electronic device. For example, the real-time casino data associated with the portable electronic device may update after a predefined period of time has elapsed, or upon a manual request by the user, or upon a change in the location of the portable electronic device, or when a new data set is available such as new bonus offers by the bonusing controller at the current location. After the location of the portable electronic device changes, the method for acquiring the location of the portable electronic device may be repeated.

Figure 7B:
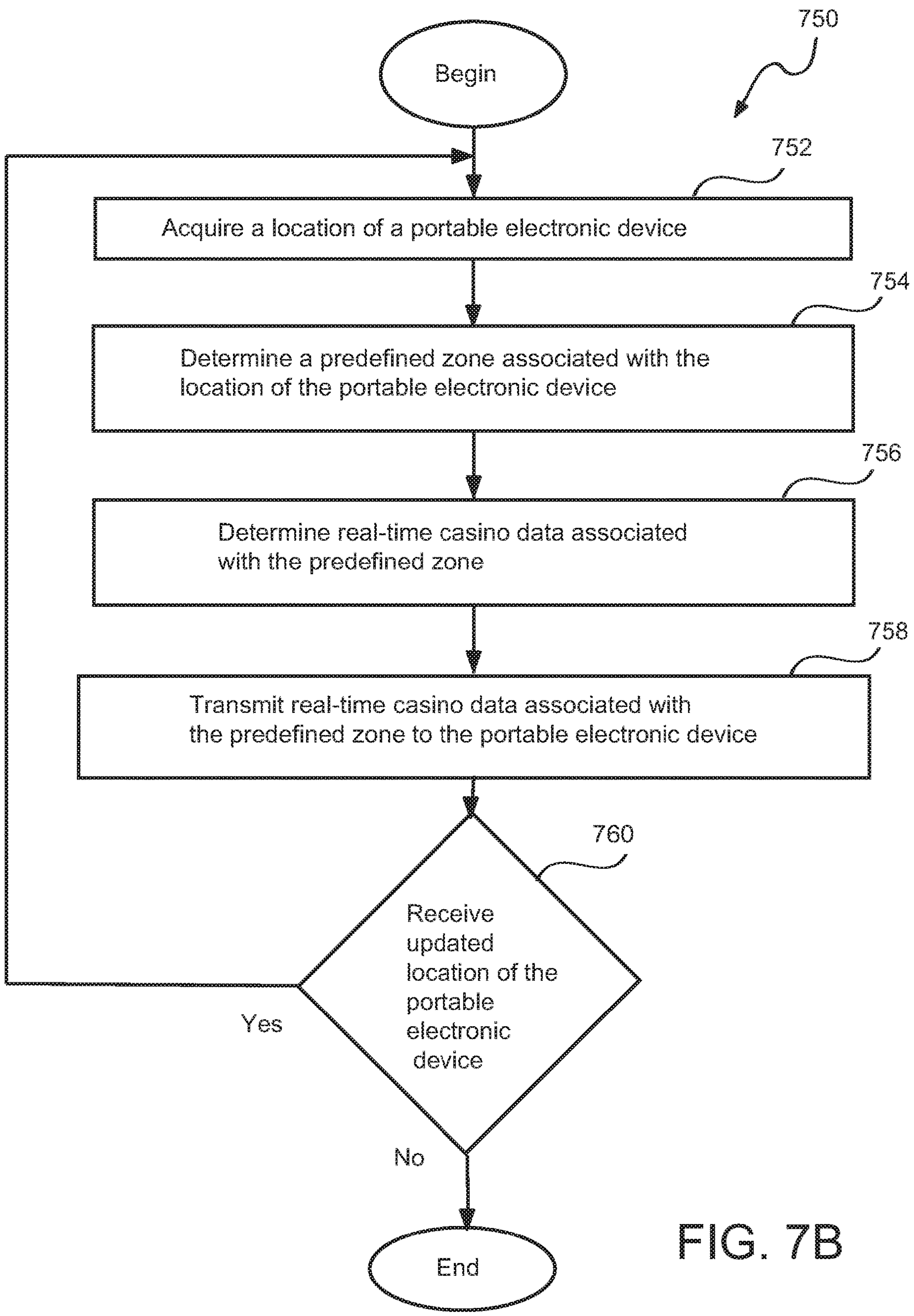
FIG. 7B illustrates a flow diagram of a method for acquiring and updating real-time casino data based on the location of a portable electronic device associated with a predefined zone within the gaming establishment environment.

FIG. 7B illustrates a flow diagram of a method for acquiring and updating real-time casino data based on a location of a portable electronic device associated with a predefined zone within a gaming establishment environment. One advantage with a predefined zone is that it is simple to implement in a piecemeal manner and scaled up as needed. All gaming devices within the zone are grouped together—versus individually tracking each device's location, privilege, preferences, permission, etc. Devices in the same zone have access to the same data, and eligible to receive the same benefits. Precise location tracking of each device within a zone is no longer required, lowering the cost of equipment, software complexity, and implementation. Further, a zone may have its own dedicated server catering to devices within the zone only. Operationally, information can be broadcast instead of one-to-one communication. For example, a mystery bonus event can be broadcasted to all devices present on the second floor of the casino. The method 750 for acquiring and updating real-time casino data associated with a predefined zone within the gaming establishment environment may be performed by acquiring a location of the portable electronic device at 752. In one embodiment, the location of the portable electronic device may be acquired using an indoor or outdoor location identifying device within the portable electronic device. In another embodiment, the location of the portable electronic device may be calculated using radio frequency (RF) wireless location tracking between the portable electronic device and at least one wireless access point distributed throughout the gaming establishment environment. In yet another embodiment, an RF transceiver within the portable electronic device may be located by its position relative to the closest access point. In still yet another embodiment, triangulation or trilateration methods may be used in conjunction with multiple stationary access points to determine the location of the portable electronic device. For example, RF fingerprinting location appliances, such as the Cisco Wireless Location Appliance™ manufactured by Cisco Systems, Inc. (San Jose, California, US), may be used to determine the location of the portable electronic device. RF fingerprinting may further refine the position data associated with the portable electronic device by comparing the live-captured RF characteristic of the current location of the portable electronic device to a known or predicted RF characteristic of a point or zone within the gaming establishment environment. In another example, location data may be determined visually by a plurality of smart cameras distributed throughout the gaming establishment environment. The smart cameras may recognize the portable electronic device by, for example, reading a 2D barcode displayed on the portable electronic device's display, and tracks its location and movement within the gaming establishment environment based on known location data of barcode reader, or nearby fixed objects. Using the portable electronic device to scan for nearby RF beacons and simply decodes their location is yet another method used when exact location is unnecessary.

The location of the portable electronic device may be associated at 754 with a predefined zone within the gaming establishment environment casino floor. The casino floor may be divided into at least one predefined zone. Certain features of the casino floor may be grouped together within the predefined zones. For example, one zone may contain at least one slot machine and another zone may contain at least one table game. In another example, a predefined zone may contain casino amenities such as at least one restaurant, concierge kiosk, theatre, and the like. As previously discussed, a zone can be physical, virtual (logically grouped), or some combinations of both. Further, each zone can have a dedicated server catering to the gaming devices within the zone, making it easy to implement a location-based function one area at a time on the casino floor.

A gaming machine may determine at 756 real-time casino data associated with the predefined zone on the casino floor that may contain the portable electronic device. The gaming machine may then transmit at 758 the real-time casino data associated with the predefined zone on the casino floor to the portable electronic device. Prior to transmitting, the real-time casino data may further be organized and/or prioritized according to the preference of the user, of the casino, of a third-party sponsor of the application data, of the location of the portable electronic device, or some combination of these. The preference maybe preset or spontaneous. The real-time casino data associated with the predefined zone on the casino floor may include gaming machine data such as player gaming preferences, player entertainment preferences, gaming machine pay-in data acquired over a predetermined period of time, gaming machine pay-out data acquired over a predetermined period of time, and game session duration data. The gaming machine data may be organized by each machine's location on the casino floor, or logically grouped. The gaming machine pay-in and pay-out data acquired over a predetermined period of time may be obtained from a central gaming server or recorded over a predefined period of time from a particular gaming machine or predefined zone on the casino floor of interest to a player. Real-time casino data acquisition maybe periodically updated when a triggering event occurs, such as when the user moved to a different zone, at a predetermined time interval, when the user manually requests a data refresh, and the like. Using the acquired data, a casino manager may evaluate a player's value to the casino, and may award spontaneous perks such as cash back, bonus spins, food/drink vouchers, etc.

The real-time casino data associated with the predefined zone on the casino floor may be presented on a display of the portable electronic device. The real-time casino data associated with the predefined zone on the casino floor may be displayed using text, graphical symbols, or augmented reality techniques such as an augmented reality map where annotations and other indicators are superimposed on a live video stream. The displayed text, graphical symbols, or augmented reality techniques may indicate the location of gaming machines within a predefined zone on the casino floor that have characteristics, which an individual player may find desirable. For example, the displayed real-time casino data may indicate the location of gaming machines within the predefined zone that have recently paid out a jackpot, gaming machines that have not recently paid out, hot players, bonus zones, and/or the location of particular themed gaming machines within the predefined zone the player prefers. The real-time casino data associated with the predefined zone on the casino floor presented on the display of the portable electronic device may also indicate the location of amenities and attractions within the gaming establishment environment, such as restrooms, concierge services, restaurants, shows, and the like.

The real-time casino data may be presented such that at least one gaming machine associated with the predefined zone on the casino floor generating revenue over the predefined period of time may be identified. The gaming machine revenue data may also identify at least one gaming machine within the predefined zone that has not generated revenue over the predefined period of time.

The augmented reality techniques used to present the real-time casino data on the display of the portable electronic device may comprise overlaying a map of the predefined zone, computer generated annotations and other indicators, within the gaming establishment environment onto real-time video captured and displayed by the portable electronic device. The overlaid map and notes may indicate gaming machines within the predefined zone that have desired characteristics, amenities within the gaming establishment environment and/or players within the predefined zone that have generated a predefined amount of revenue for the casino. The overlaid map may be referred to as an augmented reality map, and the augmented reality map may be periodically updated when the portable electronic device acquires new real-time casino data and/or when the location of the portable electronic device changes as described above.

The real-time casino data associated with the predefined zone on the casino floor containing the portable electronic device may be periodically updated and/or reprioritized at 760. For example, the real-time casino data associated with the portable electronic device may update after the predefined period of time has elapsed, upon a change in the location of the portable electronic device, or when a new offer/event has been initiated. The update may initiate when the portable electronic device moves from one predefined zone on the casino floor to another predefined zone on the casino floor. After the location of the portable electronic device changes, the method for acquiring the location of the portable electronic device may be repeated.

Figure 8A:
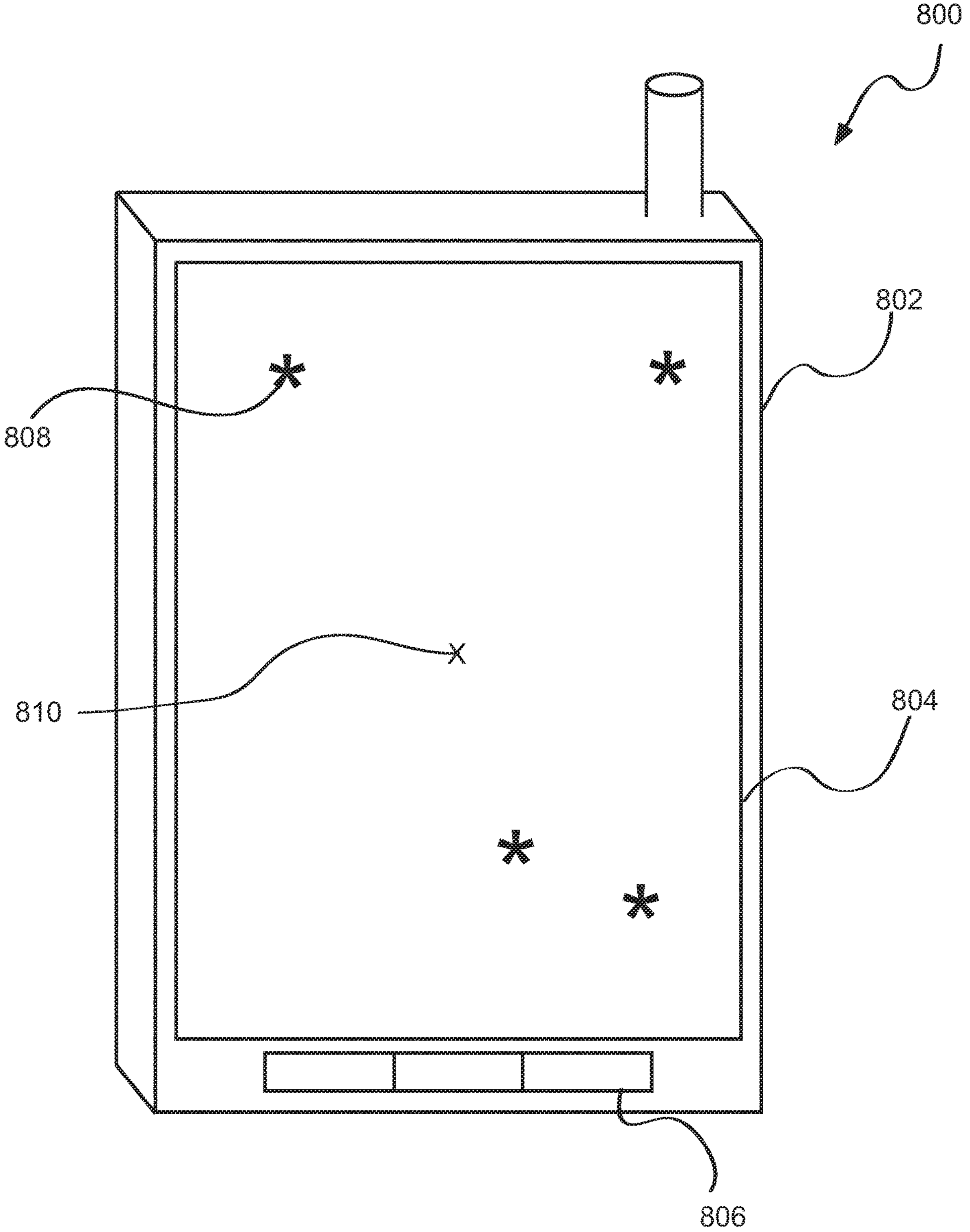
FIG. 8A illustrates a front view of an example portable electronic device presenting real-time casino data.

FIG. 8A illustrates a front view of a portable electronic device presenting real-time casino data. The portable electronic device 800 may have a housing 802 that may support a display 804. The display 804 could be, but is not limited to, a touch screen configured to receive input from a user. The portable electronic device 800 may also have user actuatable buttons 806 that may allow the user to navigate the real-time casino data presented on the display 804. The real-time casino data may be visually represented as a map of a casino floor within a gaming establishment environment. The map may display an icon 810 denoting a current location of the portable electronic device. The map may also display another icon 808 denoting gaming machines or other features of the casino floor of interest to the user. For example, the icons 808 may mark the locations of gaming machine that have not paid out within a user-defined period of time. As another example, the icons 808 may denote locations of a desired amenity, such as restrooms, on the casino floor relative to the user's current location marked by the icon 810.

Figure 8B:
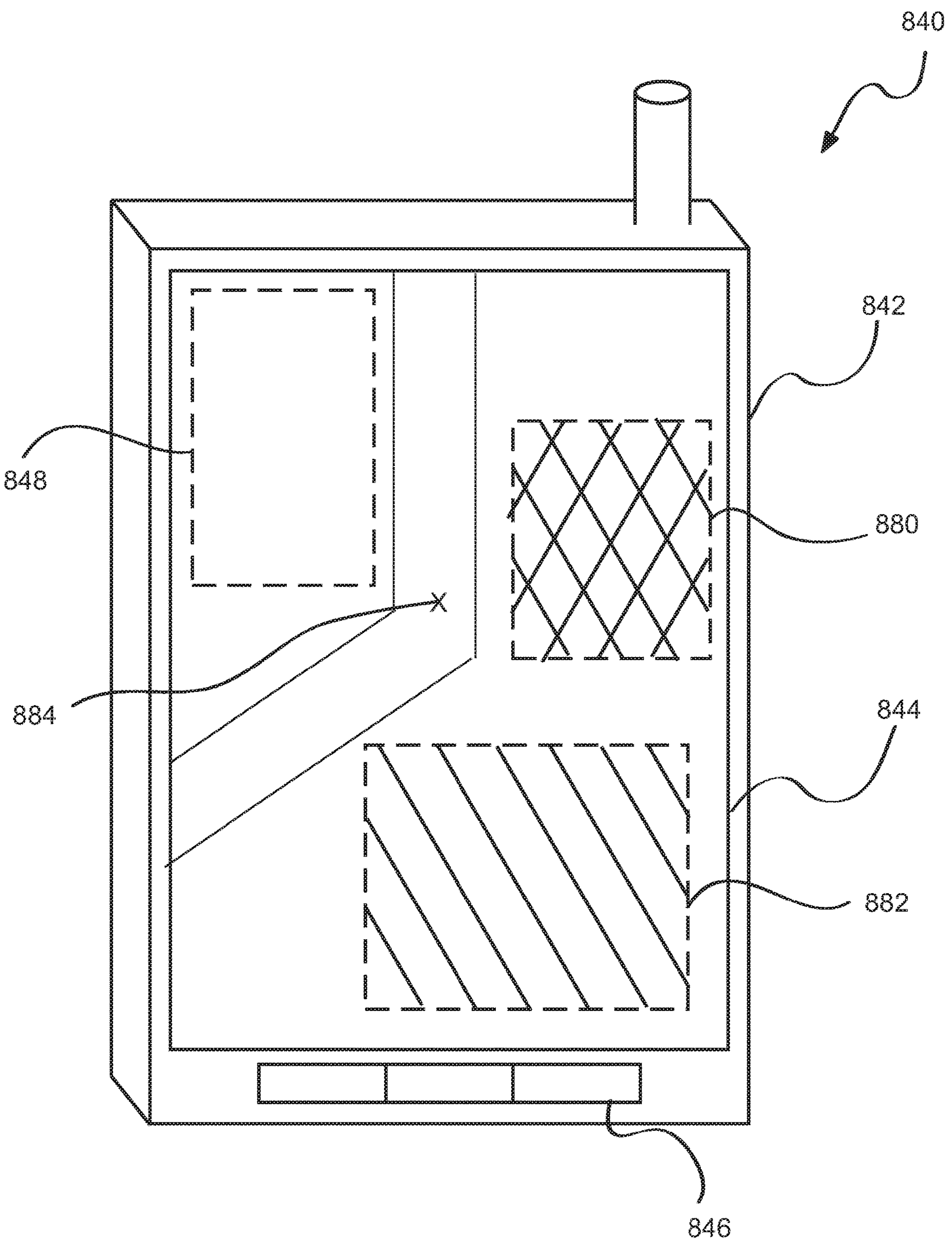
FIG. 8B illustrates a front view of an example portable electronic device presenting real-time casino data associated with at least one predefined zone on the casino floor.

FIG. 8B illustrates a front view of a portable electronic device presenting real-time casino data associated with at least one predefined zone on a casino floor. The portable electronic device 840 may have a housing 842 that may support a display 844. The display 844 could be, but is not limited to being, a touch screen configured to receive input from a user. The portable electronic device 840 may also have user actuatable buttons 846 that may allow the user to navigate the real-time casino data associated with at least one predefined zone on the casino floor presented on the display 844.

The real-time casino data associated with the at least one predefined zone on the casino floor may be visually represented as a map of the casino floor within the gaming establishment environment. The map may display an icon 854 denoting the current location of the portable electronic device that may be carried by the user. The map may also display icons representing at least one predefined zone on the casino floor. For example, the map may display a predefined zone 848 that contains mainly table games. In another example, the map may display a predefined zone 850 that contains mainly slot machines with mystery bonus feature. In yet another example, the map may display a predefined zone 852 that contains mainly casino amenities such as a bar or restaurant. In still yet another example, the relative locations of the predefined zones 848, 850, and 852 may be displayed relative to the icon 854 denoting the current location of the portable electronic device. The relative locations of the predefined zones 848, 850, and 852 may be denoted by unique graphical representations on the map such as color highlights, annotations, contours, and other textual or graphical indicators. For example, zone 848 may be denoted by an open rectangle drawn with dotted lines while zone 850 may be denoted by a cross-hatched rectangle drawn with dotted lines. Zone 852 may be similarly denoted by a hatched rectangle drawn with dotted lines. The respective shadings of the rectangles representing zones 848, 850, and 852 may allow the user to quickly and easily identify zones of interest on the casino floor.

Figure 8C:
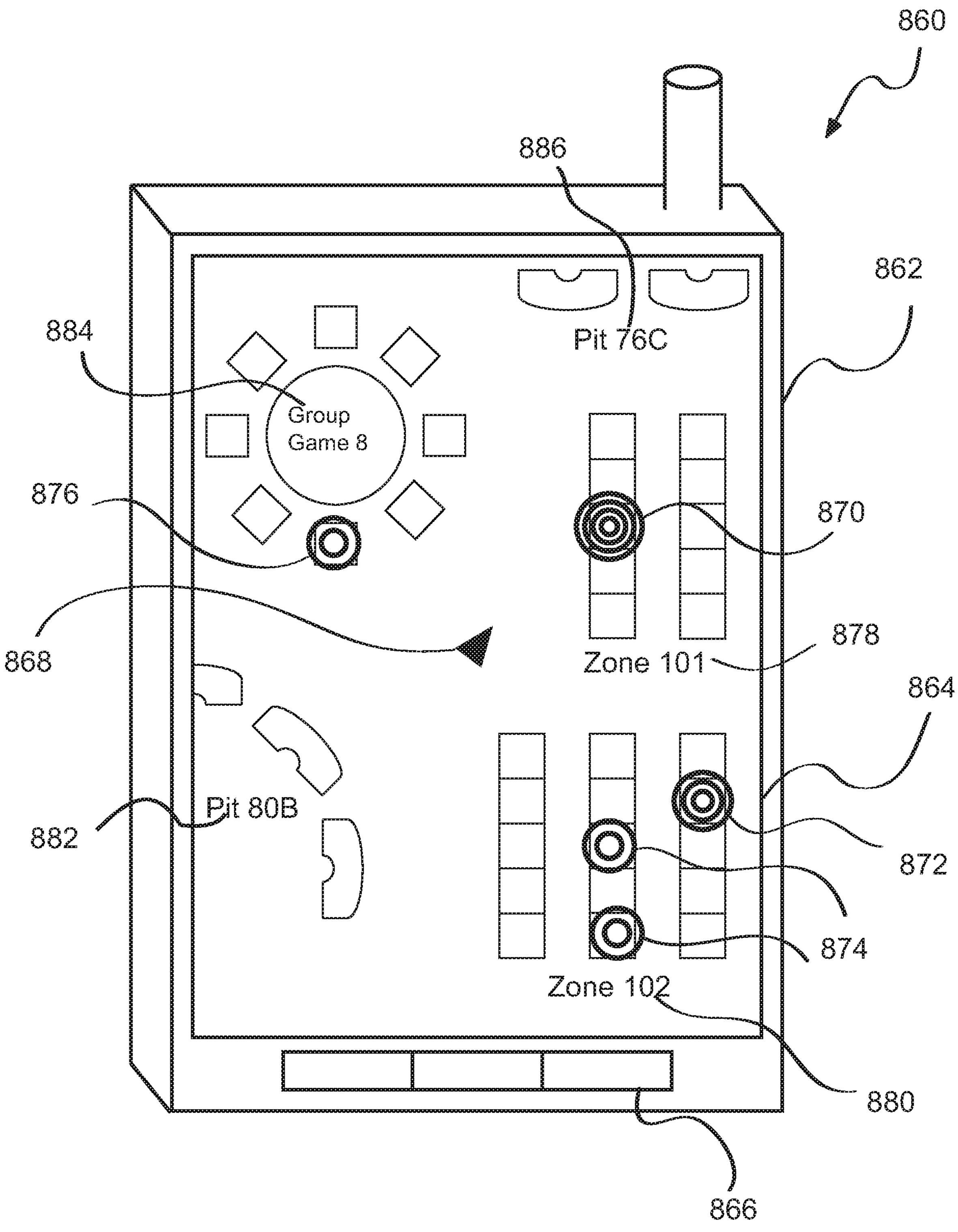
FIG. 8C illustrates a front view of an example portable electronic device presenting real-time casino data associated with at least one predefined zone on the casino floor as a gaming heat map.

FIG. 8C illustrates a front view of an example portable electronic device presenting real-time casino data associated with at least one predefined zone on a casino floor as a gaming heat map. The portable electronic device 860 may have may have a housing 862 that may support a display 864. The display 864 could be, but is not limited to, a touch screen configured to receive input from a user. The portable electronic device 860 may also have user actuatable buttons 866 that may allow the user to navigate the real-time casino data associated with at least one predefined zone on the casino floor presented on the display 864.

The real-time casino data associated with the at least one predefined zone on the casino floor may be visually represented as the gaming color heat map of the casino floor within the gaming establishment environment. The gaming color heat map may be defined as a visual representation of real-time casino data that can be translated to activities associated with predefined zones on the casino floor wherein desired features of the gaming establishment environment are prioritized and depicted visually according to their priority. For example, a player may desire to locate gaming machines within proximal predefined zones on the casino floor that have not paid out within a predefined period of time. The real-time casino data displayed on the portable electronic device may display the gaming color heat map of the casino floor with an icon representing the player 868 centered on the gaming heat map. The gaming color heat map may also display the at least one predefined zone 878 and 880 on the casino floor that contain gaming machines that have not paid out within the predefined period of time. The real-time casino data representing at least one gaming machine that has not paid out within the predefined period of time may be ranked by longest time since the last pay-out and displayed as color gradients or contours according to the ranking where the longest amount of time has elapsed since gaming machine 870 paid out, less time has elapsed since gaming machine 872 has paid out, and still less time has elapsed since gaming machines 874 paid out.

The gaming color heat map may depict at least one zone 878 and 880, and may also depict different game genres and other features such as bonus and progressives on one map. In another example, slot machines in zones 878 and 880 may be directly compared with a group game 884. In this example, an approximately equivalent amount of time has elapsed since slot machines 874 and group game 876 has paid out. The gaming heat map may also depict other predefined zones on the casino floor such as zones 882 and 886 devoted to table gaming machines.

Figure 9A:
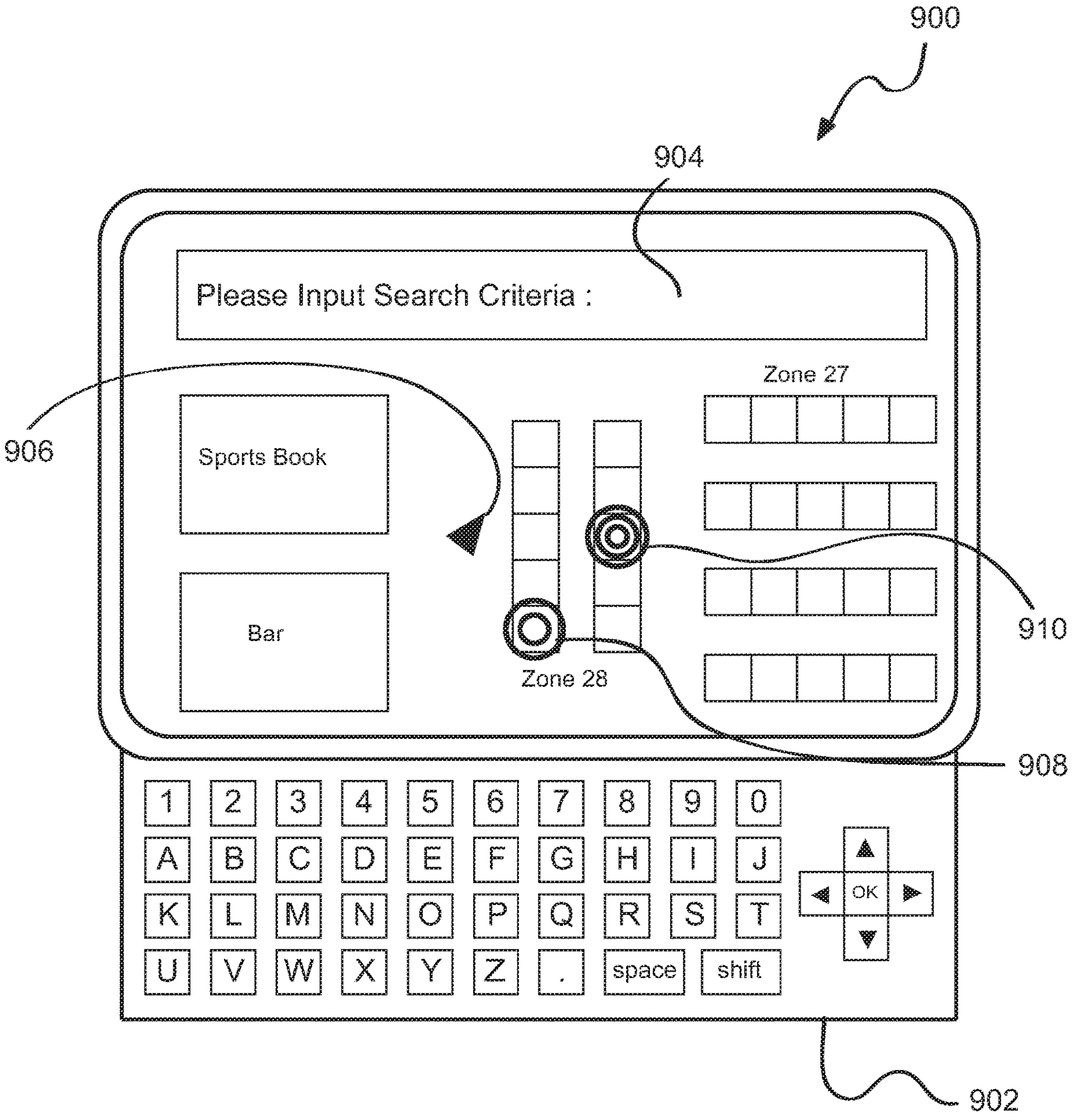
FIG. 9A illustrates an example of a portable electronic device presenting a gaming heat map.

FIG. 9A illustrates an example of a portable electronic device presenting a gaming heat map. The gaming heat map 914 is one embodiment of a visual representation of real-time casino data. Although FIG. 9A is described with reference to slot machines or game features, this is not intended to be limiting as the gaming color heat map could be for video poker machines, gaming tables, roulette tables, keno games or other such games of chance. While the portable electronic device 902 is illustrated as a mobile phone, this is not intended to be limiting as the portable electronic device 902 can be a personal media player, portable gaming device, netbook, tablet device, personal digital assistant or any other similar device.

The portable electronic device 902 may have a display 912 that can present the gaming heat map 914. The display 912 can be a liquid crystal display screen, organic light-emitting diode screen or any other type of display device found in portable electronic devices. The display 912 can have touch screen capabilities that may allow a user to manipulate the gaming heat map 914. The portable electronic device 902 may also have physical buttons or keys that can also allow the user to manipulate the gaming heat map 914.

The gaming color heat map 914 can include a casino map 916. The casino map 916 may be a scaled line drawing, photograph, live video or any other type of map. The casino map 916 may have labels and other annotations for gaming machines, game features, gaming tables, restaurants, bars, amenities, and other structures that appear within the casino map 916. In one embodiment, the casino map 916 may display a portion of the casino floor within a predefined radius around a location of the portable electronic device 902. The predefined radius may be user or casino defined. In another embodiment, the casino map 916 may display a predefined zone that the location of the portable electronic device 902 is within. The casino map 916 may refresh and display a different portion of the casino floor based upon an updated location of the portable electronic device 902 or when a new offer/event has been initiated.

The gaming heat map 914 can have an indicator 906 for the location of the portable electronic device. The indicator 906 for the location of the portable electronic device may be an icon, shape, symbol, picture, numeral, character, text or the like. The indicator 906 for the location of the portable electronic device may include location data such as coordinates and orientation. In one embodiment, the location data may be represented by the indicator 906 for the location of the portable electronic device. For example, the indicator 906 for the location of the portable electronic device can be an arrowhead, where a position of the arrowhead represents coordinates and a direction the arrowhead points represents orientation. In another embodiment, the location data can be represented by additional text adjoining the indicator 906.

The gaming color heat map 914 may have a search mechanism 904 that accepts input of at least one criterion. The search mechanism 904 can be a text input box, drop down menu, or any other mechanism that accepts user input. The user can input the at least one criterion into the search mechanism 904 via the display 912 with touch screen capabilities, the physical buttons or keys, or any other input device on the portable electronic device 902. The at least one criterion can be slot machine type, wager amount, game type, game theme, mystery bonus zone, game promotional zone, upcoming promotional zone, gaming machine data, player entertainment preferences or any other user criteria. The gaming machine data may include game session duration data, periodic pay-in data, and periodic pay-out data. The periodic pay-out data may include length of time since the last pay-out, frequency of pay-outs, amount of pay-outs, and the like.

The gaming heat map 914 may identify at least one slot machine based on the at least one criterion. The identified at least one slot machine can be represented on the gaming heat map 914 by an icon, shape, symbol, picture, numeral, character, text or other such indicia. In one embodiment, the identified at least one slot machine may be represented by a concentric ring symbol or contour lines. A slot machine represented by a concentric ring symbol with three rings 910 or tight contour lines may be a closer match to the at least one criterion then a slot machine represented by a concentric ring symbol with two rings 908 or sparse contour lines. Although the degree of correlation between a particular identified slot machine and the at least one criterion is illustrated here by the number of concentric rings, this is not intended to be limiting. The degree of correlation may be represented not only by the number of indicia but also indicia size, indicia type, color, letter grade, percentage, and the like.

Figure 9B:
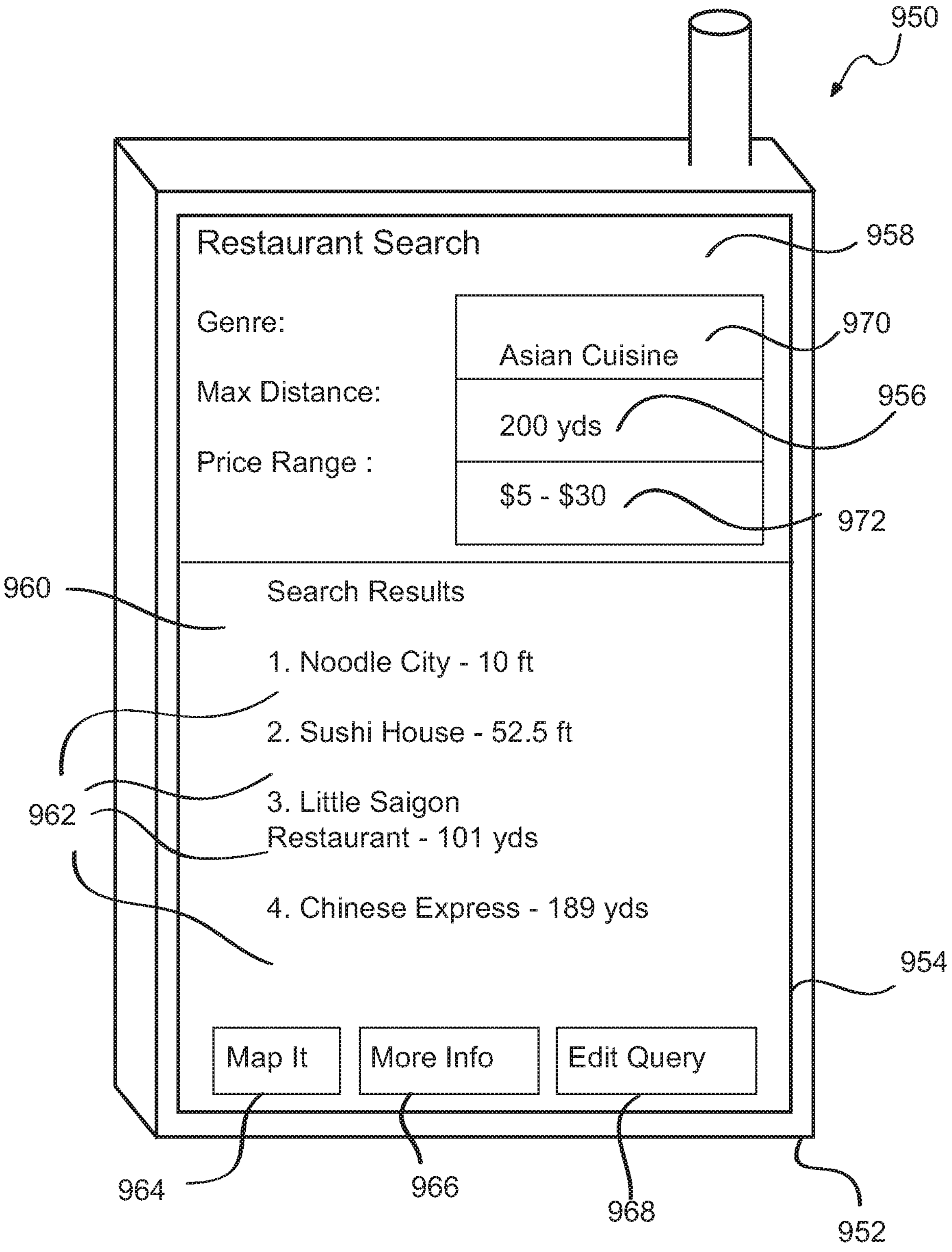
FIG. 9B illustrates an example of a portable electronic device presenting an entertainment query.

FIG. 9B illustrates an example of a portable electronic device presenting an entertainment query. Although FIG. 9B is described with reference to restaurants, this is not intended to be limiting as the entertainment query could be for bars, lounges, night clubs, theaters, shows, shopping, rides, or other such casino entertainment. While the portable electronic device 952 is illustrated as a mobile phone, this is not intended to be limiting as the portable electronic device 952 can be a personal media player, portable gaming device, netbook, tablet device, personal digital assistant or any other similar device.

The portable electronic device 952 may have a display 954 that can present the entertainment query 974. The display 954 can be a liquid crystal display screen, organic light-emitting diode screen or any other type of display device found in portable electronic devices. The display 954 can have touch screen capabilities that may allow a user to manipulate the entertainment query 974. The portable electronic device 952 may also have physical buttons or keys that can also allow the user to manipulate the entertainment query 974.

The entertainment query 974 may have a search mechanism 958 that accepts input of at least one criterion. The search mechanism 958 can have a single or multiple text input boxes, drop down menus, or the like. In one example, where the entertainment query 974 is for restaurants, the search mechanism 958 may contain a genre text input box 970, a max distance text input box 956, and a price range text input box 972. The genre text input box 970 can accept user food genre preferences such as pizza, Italian, vegetarian burrito, Asian cuisine, and any other food preferences the user may have. The max distance text input box 956 may accept a maximum distance for a restaurant location from a current location of the portable electronic device 952. The price range text input box 972 can accept user price range preferences. The at least one criterion may also include restaurant ratings. The user can input the at least one criterion into the search mechanism 958 via the display 954 with touch screen capabilities, the physical buttons or keys, or any other input device on the portable electronic device 952.

The entertainment query 974 may have a search results dialogue 960. The search results dialogue 960 may contain a plurality of search result items 962. Each search result item may include a name for a particular search result item and a distance from the particular search result item to the current location of the portable electronic device 952. The plurality of search result items 962 may be arranged in a list based upon degree of correlation to the at least one criterion, distance, price, alphabetical order, or any other sorting or ordering method.

The entertainment query 974 may have a map it function 964. The map it function 964 may present a casino map on the display 954. The casino map may be a scaled line drawing, photograph, or any other type of map. The casino map may have labels for gaming machines, gaming tables, restaurants, bars, amenities, and other structures that appear within the casino map. The casino map may indicate the current location of the portable electronic device 952 and the location of a selected search result item. The map it function 964 may also present navigation directions from the current location of the portable electronic device 952 to a location of the selected search result item on the display 954.

The entertainment query 974 may have a more info function 966. The more info function 966 may present additional information associated with the selected search result item on the display 954. The additional information may include menus, price range, recommended dishes, specials, sales, pictures, show programs, theater maps, casino promotions, and the like. The entertainment query 974 may have an edit query function 968. The edit query function 968 may facilitate editing of the at least one criterion. Editing may be performed via the display 954 with touch screen capabilities, the physical buttons or keys, or any other input device on the portable electronic device 952.

Figure 10A:
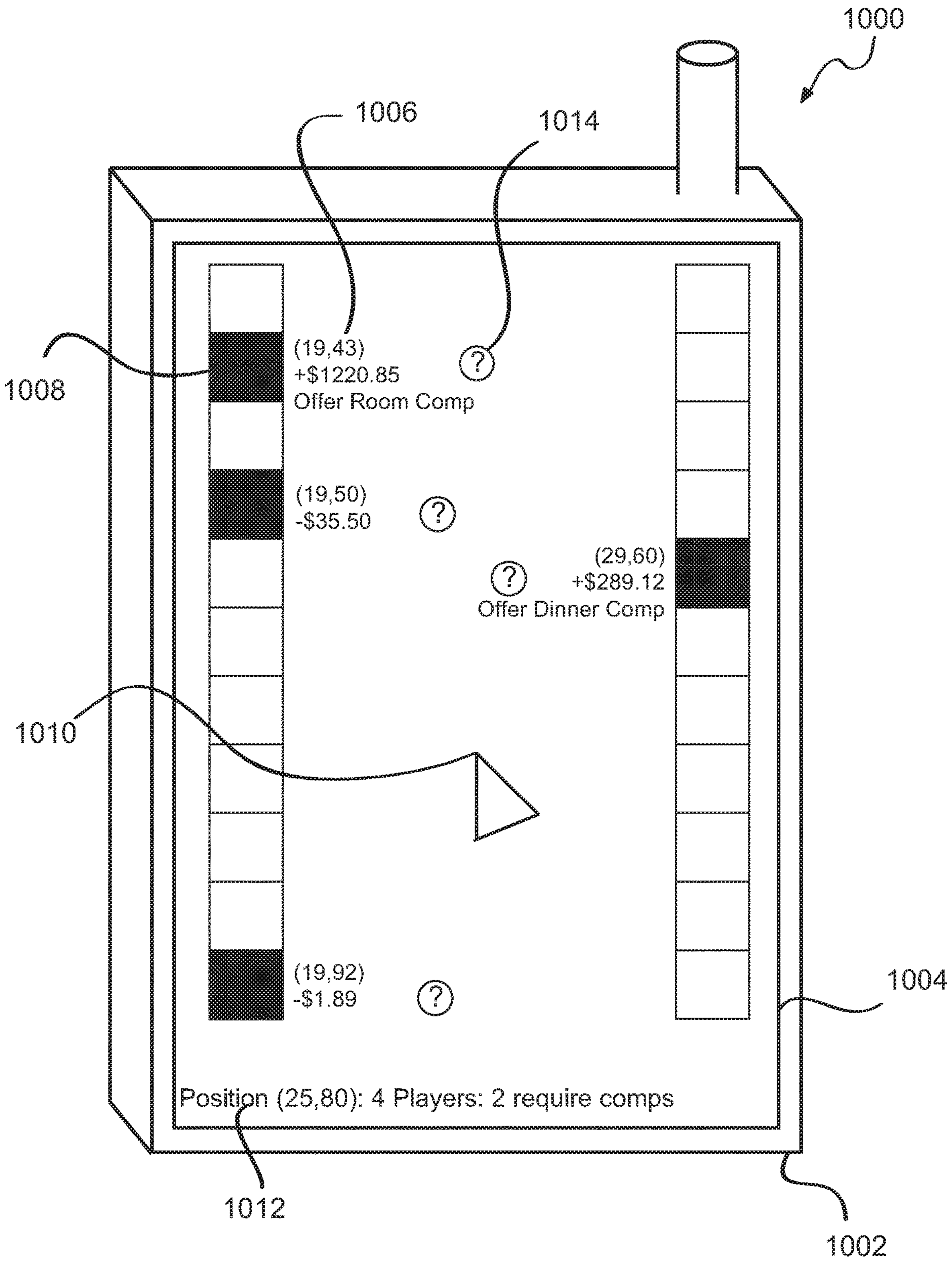
FIG. 10A illustrates an example of a portable electronic device presenting a compensation visual representation.

FIG. 10A illustrates an example of a portable electronic device presenting a player compensation visual representation. Although FIG. 10A is described with reference to slot machine players, this is not intended to be limiting as the compensation visual representation 1016 could be for players of video poker machines, gaming tables, roulette tables, keno games or other such games of chance. While the portable electronic device 1002 is illustrated as a mobile phone, this is not intended to be limiting as the portable electronic device 1002 can be a personal media player, portable gaming device, netbook, tablet device, personal digital assistant or any other similar device.

The portable electronic device 1002 may have a display 1004 that can present the player compensation visual representation 1016. The display 1004 can be a liquid crystal display screen, organic light-emitting diode screen or any other type of display device found in portable electronic devices. The display 1004 can have touch screen capabilities that may allow a user to manipulate the compensation visual representation 1016. The portable electronic device 1002 may also have physical buttons or keys that can also allow the user to manipulate the compensation visual representation 1016.

The player compensation visual representation 1016 can have an indicator 1010 denoting a location of the portable electronic device. The indicator 1010 denoting the location of the portable electronic device may be an icon, shape, symbol, picture, numeral, character, text or the like. The indicator 1010 denoting the location of the portable electronic device may include location data such as coordinates and orientation. In one embodiment, the location data may be represented by the indicator 1010 denoting the location of the portable electronic device. For example, the indicator 1010 denoting the location of the portable electronic device can be an arrowhead, where a position of the arrowhead represents coordinates and a direction the arrowhead points represents orientation. In another embodiment, the location data can be represented by additional text adjoining the indicator 1010.

The player compensation visual representation 1016 can include a casino map 1018. The casino map 1018 may be a scaled line drawing, photograph, still image, live video, or any other type of map. The casino map 916 may have labels for gaming machines, gaming tables, restaurants, bars, amenities, and other structures that appear within the casino map 1018. In one embodiment, the casino map 1018 may display a portion of the casino floor within a predefined radius around a location of the portable electronic device 1002. The predefined radius may be user or casino defined. In another embodiment, the casino map 1018 may display a predefined zone that the location of the portable electronic device 1002 is within. The casino map 1018 may refresh and display a different portion of the casino floor based upon an updated location of the portable electronic device 1002 or when a new offer/event has been initiated.

The player compensation visual representation 1016 may have an indicator 1008 for slot machines currently being played. Although the indicator 1008 may be illustrated by a blacked out square, this illustration is not intended to be limiting as the indicator can be an icon, shape, symbol, picture, numeral, character, text or the like. The indicator 1008 for slot machines currently being played may also comprise additional text 1006. The additional text 1006 may include slot machine coordinates, slot machine revenue, suggested comps for a player based upon slot machine revenue, and other information relevant to player comps. The indicator 1008 may also comprise a more info button 1014. The more info button 1014 may present information such as preferred slot machine type, preferred game features, wager amount, game type, game theme, player entertainment preferences, game session duration data, pay-in data, length of time since the last pay-out, frequency of pay-outs, amount of pay-outs, and the like on the display 1004.

The compensation visual representation 1016 may have a status notification dialogue 1012. The status notification dialogue 1012 can display coordinates for the location of the portable electronic device, the number of slot machines currently being played, how many comps should be granted, and other information important to a casino host.

Figure 10B:
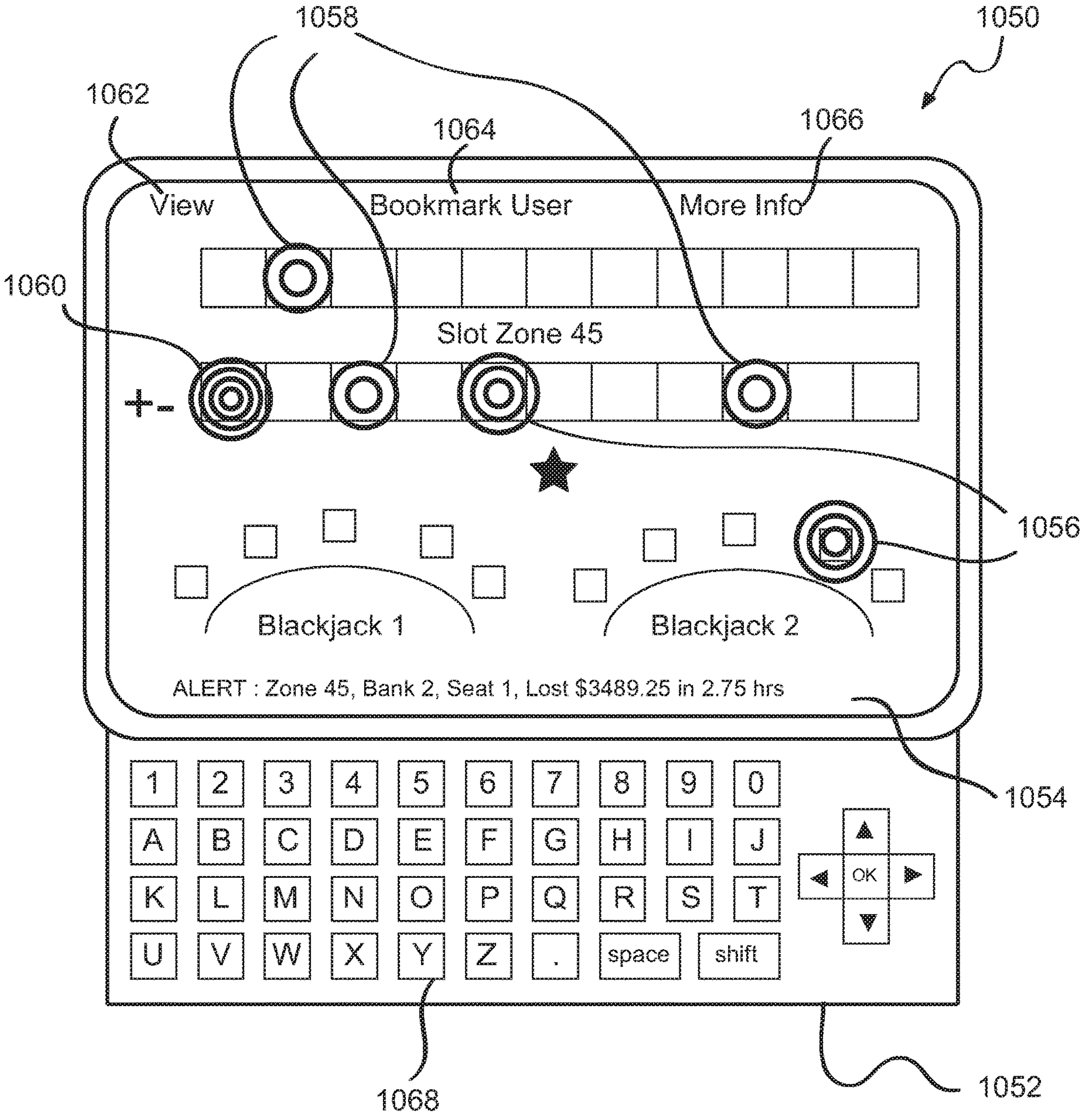
FIG. 10B illustrates an example of a portable electronic device presenting a revenue heat map.

FIG. 10B illustrates an example of a portable electronic device presenting a revenue heat map. Although FIG. 10B is described with reference to slot machines, this description is not intended to be limiting as the gaming heat map could depict video poker machines, gaming tables, roulette tables, keno games or other such games of chance and any combination of the proceeding. While the portable electronic device 1052 is illustrated as a mobile phone, this illustration is not intended to be limiting as the portable electronic device 1052 can be a personal media player, portable gaming device, netbook, tablet device, personal digital assistant or any other similar device.

The portable electronic device 1052 may have a display 1072 that can present the revenue heat map 1070. The display 1072 can be a liquid crystal display screen, organic light-emitting diode screen or any other type of display device found in portable electronic devices. The display 1072 can have touch screen capabilities that may allow a user to manipulate the revenue heat map 1070. The display 1072 may have a touch screen View button 1062 that may change views for the revenue heat map 1070.

In one embodiment, changing views may entail switching revenue heat map types from line drawing maps to image maps. In another embodiment, changing views may entail switching to a first person perspective of the casino floor with information overlaid upon the visual representation. For example, the first person perspective of the casino floor may be represented by an augmented reality map. In yet another embodiment changing views may entail altering the scope of the presented casino floor.

The display 1072 may have a touch screen Bookmark Slot Machine button 1064 that may bookmark a slot machine of interest and its location to a casino host and players alike. In one embodiment, bookmarking will allow the casino host to recall a location of the slot machine of interest. In another embodiment, the casino host can bookmark a player of interest, such as a high value player who should be pampered, by associating the portable electronic device ID with the player status and value. The display 1072 may have a touch screen "More Information" button 1066 that displays additional information 1054 for a particular slot machine (or a player). The additional information 1054 may include location, amount of revenue, and duration of gaming session. The portable electronic device 1052 may have physical buttons 1068 or keys that can also allow the user to manipulate the revenue heat map 1070. The physical buttons 1068 can be a keyboard, number pad, arrow keys, and the like.

The revenue heat map 1070 can include a casino map 1074. The casino map 1074 may be a scaled line drawing, photograph, or any other type of map. The casino map 1074 may have labels for gaming machines, gaming tables, restaurants, bars, amenities, and other structures that appear within the casino map 1074. In one embodiment, the casino map 1074 may display a portion of the casino floor within a predefined radius around a location of the portable electronic device 1052. The predefined radius may be defined by the casino host or the casino. In another embodiment, the casino map 1074 may display a predefined zone that the location of the portable electronic device 1052 is within. The casino map 1074 may refresh and display a different portion of the casino floor based upon an updated location of the portable electronic device 1052.

The revenue heat map 1070 can have an indicator 1076 denoting the location of the portable electronic device 1052. The indicator 1076 denoting the location of the portable electronic device 1052 may be an icon, shape, symbol, picture, numeral, character, text or the like. The indicator 1076 denoting the location of the portable electronic device 1052 may include location data such as coordinates and orientation. Although the indicator 1076 denoting the location of the portable electronic device 1052 is illustrated at the center of the casino map 1074, this illustration is not intended to be limiting as the indicator 1076 may be anywhere within the casino map 1074.

The revenue heat map 1070 may identify at least one slot machine or player of interest to the casino host. The interest of the casino host may depend upon slot machine revenue, gaming session duration, player's data, and/or any other criteria of interest to the casino host. The identified at least one slot machine can be represented on the revenue heat map 1070 by an icon, shape, symbol, picture, numeral, character, text or other such indicia.

In one embodiment, the identified at least one slot machine may be represented by a concentric ring symbol or contour lines. A slot machine represented by a two concentric ring symbol 1058 may have generated little revenue over a long gaming session duration. A slot machine represented by a four concentric ring symbol 1060 may have generated a large amount of revenue during a short gaming session duration. A slot machine represented by a three concentric ring symbol 1056 may have generated a moderate amount of revenue, where the moderate amount of revenue is less than the slot machine represented by a four concentric ring 1060 symbol and more than the slot machine represented by a two concentric ring symbol 1058. Although the interest level of a particular identified slot machine to the casino host is illustrated here by the number of concentric rings, this illustration is not intended to be limiting. The degree of correlation may be represented not only by the number of indicia but also indicia size, indicia type, density of contour lines, color, letter grade, percentage, and the like.

Additional information on gaming systems, including gaming device and viral gaming events, can be found in U.S. Pat. No. 8,864,586, which is hereby incorporated herein by reference.

Additional information on gaming systems, including location based real-time casino data, can be found in U.S. Pat. No. 9,626,826, which is hereby incorporated herein by reference.

While embodiments and applications of this invention have been shown and described, it would be apparent to those skilled in the art having the benefit of this disclosure that many more modifications than mentioned above are possible without departing from the inventive concepts herein.

What is claimed is:

1. A method for a portable electronic device, the method comprising:

communicating, via the portable electronic device, with at least one of an access point or an RF beacon positioned at a location within a gaming establishment;

determining, with the portable electronic device, an updated location of the portable electronic device within the gaming establishment based on the location of the at least one of the access point or the RF beacon;

transmitting, from the portable electronic device to a gaming device within the gaming establishment, the updated location of the portable electronic device within the gaming establishment;

receiving, with the portable electronic device, real-time statistical data from the gaming device, wherein the real-time statistical data is acquired by the gaming device as a result of the gaming device operating a wager-based game at the gaming establishment over a predetermined period of time, and wherein the real-time statistical data received from the gaming device varies as the updated location of the portable electronic device varies within the gaming establishment; and presenting at least a portion of the received real-time statistical data on a display of the portable electronic device.

2. The method of claim 1, comprising, prior to presenting at least the portion of the received real-time statistical data, organizing, with the portable electronic device, the received real-time statistical data based on preferences of a user associated with the portable electronic device.

3. The method of claim 1, comprising, prior to presenting at least the portion of the received real-time statistical data, prioritizing, with the portable electronic device, the received real-time statistical data based on preferences of a user associated with the portable electronic device.

4. The method of claim 1, wherein receiving the real-time statistical data comprises receiving pay-in data acquired by the gaming device over the predetermined period of time, pay-out data acquired by the gaming device over the predetermined period of time, or game session duration data acquired by the gaming device over the predetermined period of time.

5. The method of claim 1, comprising:

providing interest criteria via the portable electronic device; and wherein the received real-time statistical data is based on the provided interest criteria.

6. The method of claim 5, wherein the interest criteria includes players who have spent a specified amount during the predetermined period of time, winning players, losing players, or players who have been at the gaming device for the predetermined period of time.

7. One or more non-transitory computer-readable storage devices comprising instructions, which when executed by a gaming device, cause the gaming device to:

receive, from a portable electronic device within a gaming establishment, an updated location for the portable electronic device that is based on communication between the portable electronic device and at least one of an access point or an RF beacon positioned at a location within the gaming establishment; and transmit real-time statistical data for a selection of one or more gaming devices from gaming devices within the gaming establishment to the portable electronic device, wherein the real-time statistical data is acquired as a result of each respective gaming device operating a wager-based game at the gaming establishment, and wherein the selection of the one or more gaming devices varies as the updated location of the portable electronic device varies within the gaming establishment.

8. The one or more non-transitory computer-readable storage devices of claim 7, wherein the instructions, when executed, cause the gamine device to:

select the selection of the one or more gamine devices based on the updated location of the portable electronic device; and transmit the real-time statistical data for the selection of the one or more gamine devices to the portable electronic device.

9. The one or more non-transitory computer-readable storage devices of claim 7, wherein the instructions, when executed, cause the gaming device to organize the real-time statistical data based on preferences of a user associated with the portable electronic device.

10. The one or more non-transitory computer-readable storage devices of claim 7, wherein the instructions, when executed, cause the gaming device to prioritize the real-time statistical data based on preferences of a user associated with the portable electronic device.

11. The one or more non-transitory computer-readable storage devices of claim 7, wherein the real-time statistical data includes pay-in data acquired by the selection of the one or more gamine devices over a predetermined period of time, pay-out data acquired by the selection of the one or more gaming devices over the predetermined period of time, or game session duration data acquired by the selection of the one or more gamine devices over the predetermined period of time.

12. A portable electronic device, comprising:

a display device;

a transceiver configured to communicate with at least one of an access point or an RF beacon positioned at a location within a gaming establishment; and a processor configured to:

determine an updated location of the portable electronic device within the gaming establishment based on the location of the at least one of the access point or the RF beacon;

transmit the updated location of the portable electronic device to a gaming device within the gaming establishment;

receive real-time statistical data from the gaming device within the gaming establishment, wherein the real-time statistical data is acquired as a result of the gaming device operating wager-based games at the gaming establishment, and wherein the received real-time statistical data varies as the updated location of the portable electronic device varies within the gaming establishment; and present at least the updated location of the portable electronic device with regard to the gaming device and a portion of the real-time statistical data for the gaming device on a display of the portable electronic device.

13. The portable electronic device of claim 12, wherein the processor is configured to present the portion of the real-time statistical data for the gaming device via a heat map that overlays the updated location of the portable electronic device presented for the portable electronic device and a presented location of the gaming device.

14. The portable electronic device of claim 12, comprising:

a software application executed by the processor;

wherein the processor is configured to:

transmit a software digital signature of the software application; and receive the real-time statistical data based on the software digital signature transmitted by the portable electronic device.

15. The portable electronic device of claim 12, wherein the processor is configured to:

transmit an encrypted user identifier; and receive the real-time statistical data based on the encrypted user identifier transmitted by the portable electronic device.

16. The portable electronic device of claim 12, wherein the processor is configured to receive, via the transceiver, the real-time statistical data organized based on preferences of a user associated with the portable electronic device.

17. The portable electronic device of claim 12, wherein the real-time statistical data is received by the transceiver and includes pay-in data acquired for the gaming device over a predetermined period of time, pay-out data acquired for the gaming device over the predetermined period of time, or game session duration data acquired for the gaming device over the predetermined period of time.

* * * * *